(12) United States Patent
Hurst et al.

(10) Patent No.: US 7,648,334 B2
(45) Date of Patent: Jan. 19, 2010

(54) AIRFOIL FOR A SECOND STAGE NOZZLE GUIDE VANE

(75) Inventors: Andrew James Hurst, Somerset (GB); Simon Charles Harding, Devon (GB)

(73) Assignee: Rolls-Royce Power Engineering PLC, Derby (GB)

( * ) Notice: Subject to any disclaimer, the term of this patent is extended or adjusted under 35 U.S.C. 154(b) by 605 days.

(21) Appl. No.: 11/644,133

(22) Filed: Dec. 22, 2006

(65) Prior Publication Data

US 2007/0183898 A1 Aug. 9, 2007

Related U.S. Application Data

(60) Provisional application No. 60/755,041, filed on Dec. 29, 2005.

(51) Int. Cl.
  *F01D 9/02* (2006.01)
(52) U.S. Cl. .................... 415/115; 415/191; 415/211.2; 29/889.2
(58) Field of Classification Search ................. 415/115, 415/191, 211.2; 29/889.2, 889.22
  See application file for complete search history.

(56) References Cited

U.S. PATENT DOCUMENTS

| | | | |
|---|---|---|---|
| 5,419,039 A | 5/1995 | Auxier et al. | |
| 5,980,209 A | 11/1999 | Barry et al. | |
| 6,022,188 A | 2/2000 | Bancalari | |
| 6,398,489 B1 | 6/2002 | Burdgick et al. | |
| 6,450,770 B1 | 9/2002 | Wang et al. | |
| 6,461,109 B1 | 10/2002 | Wedlake et al. | |
| 6,461,110 B1 | 10/2002 | By et al. | |
| 6,474,948 B1 | 11/2002 | Pirolla et al. | |
| 6,503,054 B1 | 1/2003 | Bielek et al. | |
| 6,503,059 B1 | 1/2003 | Frost et al. | |
| 6,511,762 B1 | 1/2003 | Lee et al. | |
| 6,558,122 B1 | 5/2003 | Xu et al. | |
| 6,685,434 B1 | 2/2004 | Humanchuk | |
| 6,715,990 B1 | 4/2004 | Arness et al. | |
| 6,722,852 B1 | 4/2004 | Wedlake et al. | |
| 6,739,838 B1 | 5/2004 | Bielek et al. | |
| 6,739,839 B1 | 5/2004 | Brown et al. | |
| 6,769,878 B1 | 8/2004 | Parker et al. | |
| 6,769,879 B1 | 8/2004 | Cleveland et al. | |
| 6,779,977 B2 | 8/2004 | Lagrange et al. | |
| 6,779,980 B1 | 8/2004 | Brittingham et al. | |
| 6,808,368 B1 | 10/2004 | Tomberg et al. | |
| 6,832,897 B2 | 12/2004 | Urban | |
| 6,854,961 B2 | 2/2005 | Zhang et al. | |
| 6,857,855 B1 | 2/2005 | Snook et al. | |
| 6,881,038 B1 | 4/2005 | Beddard et al. | |

(Continued)

FOREIGN PATENT DOCUMENTS

EP   0 112 003 A1   6/1984

(Continued)

*Primary Examiner*—Ninh H Nguyen
(74) *Attorney, Agent, or Firm*—Krieg DeVault LLP; Matthew D. Fair, Esq.

(57) ABSTRACT

The present invention provides an airfoil a second stage nozzle guide vane having an external surface with first and second sides. The external surface extends spanwise between a hub and a tip and streamwise between a leading edge and a trailing edge of the airfoil. The external surface includes a contour substantially defined by Table 1 as listed in the specification.

22 Claims, 9 Drawing Sheets

U.S. PATENT DOCUMENTS

| | | | |
|---|---|---|---|
| 6,884,038 B2 | 4/2005 | Hyde et al. | |
| 6,887,041 B2 * | 5/2005 | Coke et al. | 415/191 |
| 6,910,868 B2 | 6/2005 | Hyde et al. | |
| 7,001,147 B1 * | 2/2006 | Phillips et al. | 415/191 |
| 7,329,093 B2 * | 2/2008 | Vandeputte et al. | 415/191 |
| 7,367,779 B2 * | 5/2008 | Girgis et al. | 416/223 A |
| 2003/0017052 A1 | 1/2003 | Frost et al. | |
| 2003/0021680 A1 | 1/2003 | Bielek et al. | |
| 2004/0057833 A1 | 3/2004 | Arness et al. | |
| 2004/0115058 A1 | 6/2004 | Lagrange et al. | |
| 2004/0223849 A1 | 11/2004 | Urban | |
| 2004/0241002 A1 | 12/2004 | Zhang et al. | |
| 2005/0008485 A1 | 1/2005 | Tsuru et al. | |
| 2005/0013695 A1 | 1/2005 | Hyde et al. | |
| 2005/0019160 A1 | 1/2005 | Hyde et al. | |
| 2005/0031453 A1 | 2/2005 | Snook et al. | |
| 2005/0079061 A1 | 4/2005 | Beddard et al. | |
| 2005/0111978 A1 | 5/2005 | Strohl et al. | |
| 2007/0154316 A1 | 7/2007 | Clarke | |
| 2007/0154318 A1 | 7/2007 | Saltman et al. | |
| 2007/0183895 A1 | 8/2007 | Sheffield | |
| 2007/0183896 A1 | 8/2007 | Jay et al. | |
| 2007/0183897 A1 | 8/2007 | Sadler et al. | |
| 2007/0183898 A1 | 8/2007 | Hurst et al. | |

FOREIGN PATENT DOCUMENTS

| | | |
|---|---|---|
| EP | 0 887 513 A2 | 12/1998 |
| EP | 1 258 597 A | 11/2002 |
| EP | 1 258 598 A | 11/2002 |
| EP | 1375825 | 1/2004 |
| EP | 1 455 053 | 9/2004 |
| EP | 1 584 788 | 10/2005 |
| EP | 1 584 795 A | 10/2005 |
| EP | 1 331 360 A2 | 7/2007 |
| GB | 1560683 A | 6/1980 |
| WO | PCT/IB2006/004323 | 12/2006 |

* cited by examiner

AIRFOIL FOR A SECOND STAGE NOZZLE GUIDE VANE

RELATED APPLICATIONS

The present application claims the benefit of U.S. patent application Ser. No. 60/755,041 filed Dec. 29, 2005, which is incorporated herein by reference.

FIELD OF THE INVENTION

The present invention relates to improved airfoil geometry, and more particularly to a high efficiency airfoil for a turbine nozzle guide vane in a gas turbine engine.

BACKGROUND

Gas turbine engine designers continuously work to improve engine efficiency, to reduce operating costs of the engine, and to reduce specific exhaust gas emissions such as NOx, CO2, CO, unburnt hydrocarbons, and particulate matter. The specific fuel consumption (SFC) of an engine is inversely proportional to the overall thermal efficiency of the engine, thus, as the SFC decreases the fuel efficiency of the engine increases. Furthermore, specific exhaust gas emissions typically decrease as the engine becomes more efficient. The thermal efficiency of the engine is a function of component efficiencies, cycle pressure ratio and turbine inlet temperature. The present invention contemplates increased thermal efficiency for a gas turbine engine by improving turbine efficiency through a new aerodynamic design of an airfoil for a second stage turbine nozzle guide vane.

SUMMARY

The present invention provides an airfoil with an external surface having first and second sides, the external surface extends spanwise between a hub and a tip and streamwise between a leading edge and a trailing edge. The external surface has a contour substantially defined by Table 1 as listed in the specification.

In another aspect of the present invention, a turbine nozzle guide vane assembly for a gas turbine engine can include an inner shroud having an upper surface and a lower surface, the upper surface of the inner shroud partially defining an inner flow path wall. An airfoil can extend radially outward from the upper surface of the inner shroud relative to an axis of rotation of the gas turbine engine. The airfoil includes first and second three-dimensional external surfaces that extend between a hub and a tip in a spanwise direction and between a leading edge and a trailing edge in a streamwise direction. A Cartesian coordinate array having X, Y and Z axis coordinates listed in Table 1 of the specification defines the first and second external surfaces of the airfoil.

Another aspect of the present invention provides for a method of forming an airfoil for a turbine nozzle guide vane. The method includes forming a contoured three-dimensional external surface of an airfoil defined by Cartesian (X, Y and Z) coordinates listed in the specification as Table 1, wherein the Z axis coordinates are generally measured in a radial direction from a longitudinal axis, the X axis coordinates are generally measured normal to the Z axis in a streamwise direction, and the Y axis coordinates are generally measured normal to the Z axis and normal to the X axis.

Another aspect of the present invention provides for a method of forming an airfoil for a turbine nozzle guide vane. The method includes forming a contoured three-dimensional external surface of an airfoil defined by Cartesian (X, Y and Z) coordinates listed in the specification as Table 1, wherein the Z axis coordinates are generally measured from an engine centerline axis, the X axis coordinates are generally measured normal to the Z axis in a streamwise direction, and the Y axis coordinates are generally measured normal to the Z axis and normal to the X axis.

BRIEF DESCRIPTION OF THE DRAWINGS

The description herein makes reference to the accompanying drawings wherein like reference numerals refer to like parts throughout the several views, and wherein.

DETAILED DESCRIPTION

For purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 1:
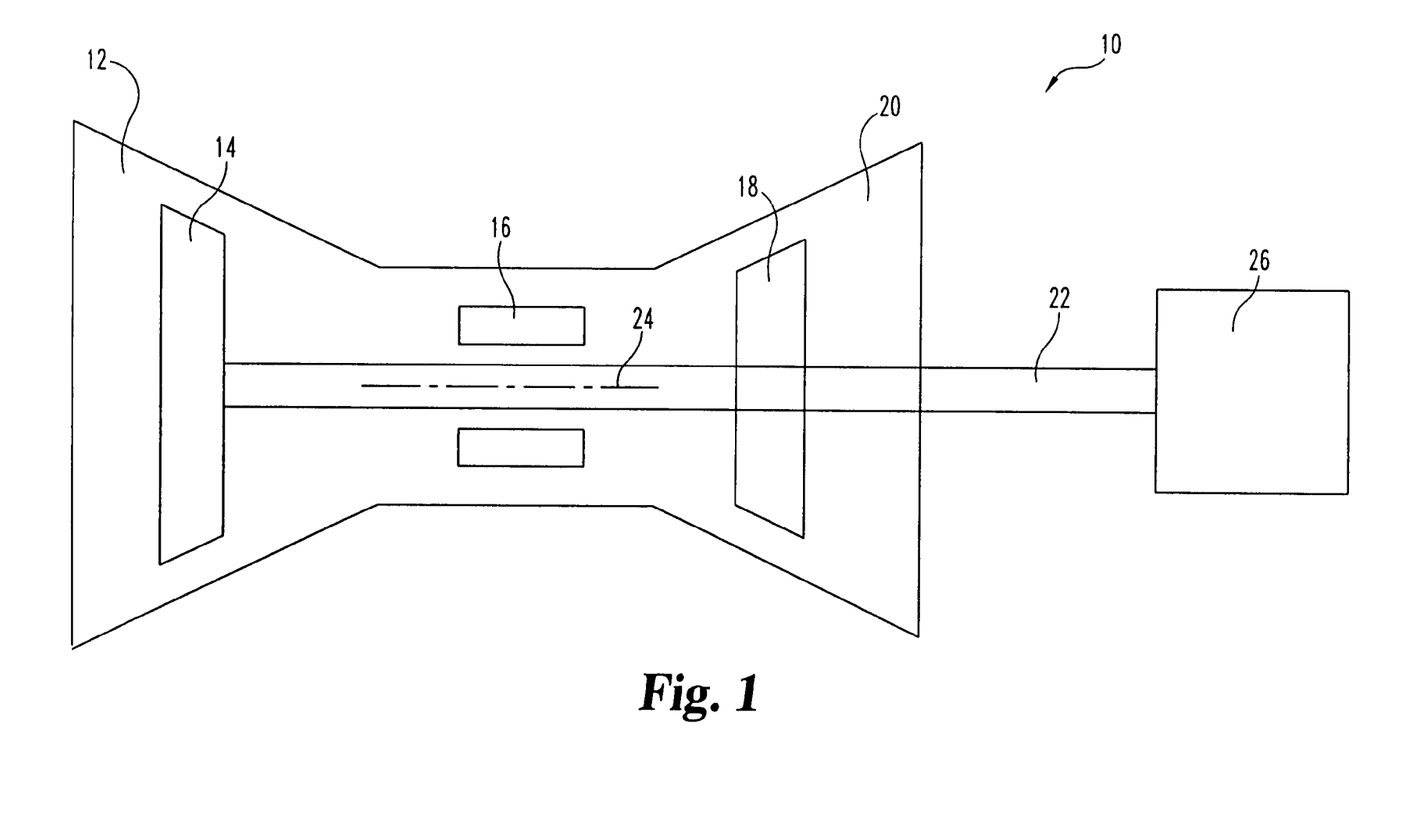
FIG. 1 is a schematic representation of a gas turbine engine.

Referring to FIG. 1, a schematic view of a gas turbine engine 10 is depicted. While the gas turbine engine 10 is illustrated with one spool (i.e. one shaft connecting a turbine and a compressor), it should be understood that the present invention is not limited to any particular engine design or configuration and as such may be used in multi spool engines of the aero or power generation type. The gas turbine engine 10 will be described generally, however significant details regarding general gas turbine engines will not be presented herein as it is believed that the theory of operation and general parameters of gas turbine engines are well known to those of ordinary skill in the art.

The gas turbine engine 10 includes an inlet section 12, a compressor section 14, a combustor section 16, a turbine section 18, and an exhaust section 20. In operation, air is drawn in through the inlet 12 and compressed to a high pressure relative to ambient pressure in the compressor section 14. The air is mixed with fuel in the combustor section 16 wherein the fuel/air mixture burns and produces a high temperature and pressure working fluid from which the turbine section 18 extracts power. The turbine section 18 is mechanically coupled to the compressor section 14 via a shaft 22. The shaft 22 rotates about a centerline axis 24 that extends axially along the longitudinal axis of the engine 10, such that as the turbine section 18 rotates due to the forces generated by the high pressure working fluid, the compressor section 14 is rotatingly driven by the turbine section 18 to produce compressed air. A portion of the power extracted from the turbine section 18 can be utilized to drive a secondary device 26, which in one embodiment can be an electrical generator. The electrical generator can be run at a substantially constant speed that is appropriate for a desired power grid frequency; a non-limiting example being 50 or 60 Hz. Alternatively the secondary device 26 can be in the form of a compressor or pump for use in fluid pipelines such as oil or natural gas lines.

Figure 2:
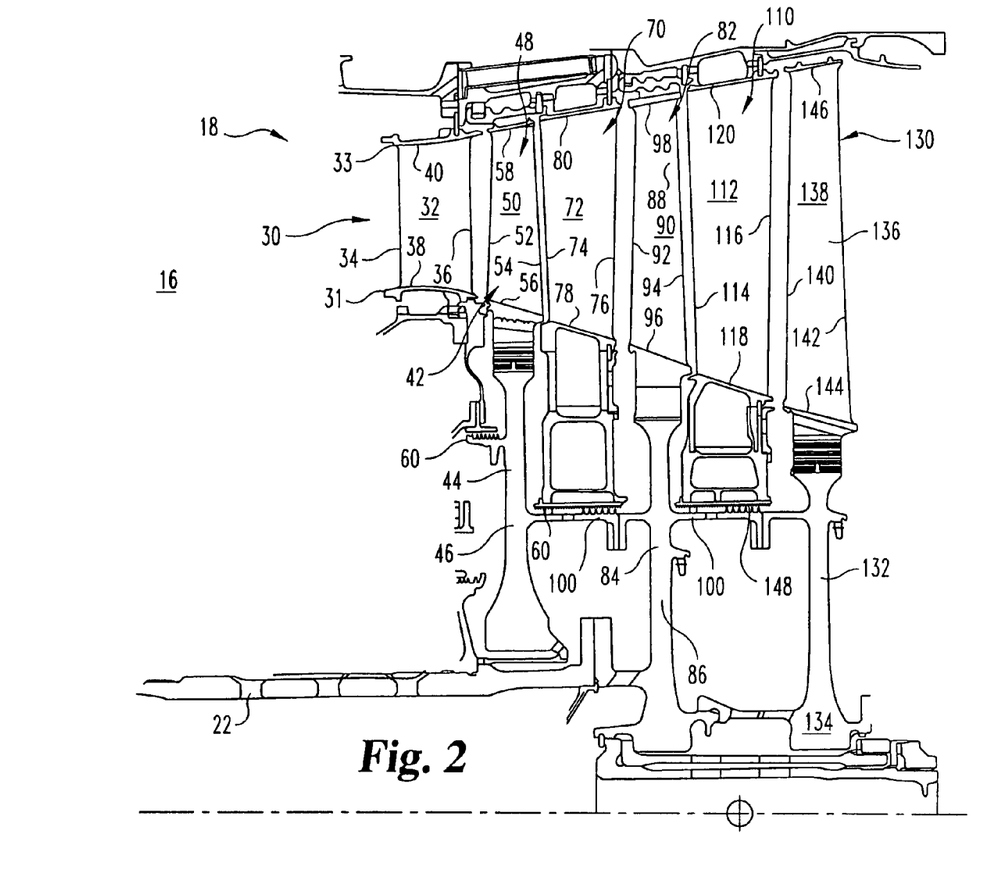
FIG. 2 is a cross-sectional view of a turbine module for the gas turbine engine of FIG. 1.
Figure 3:
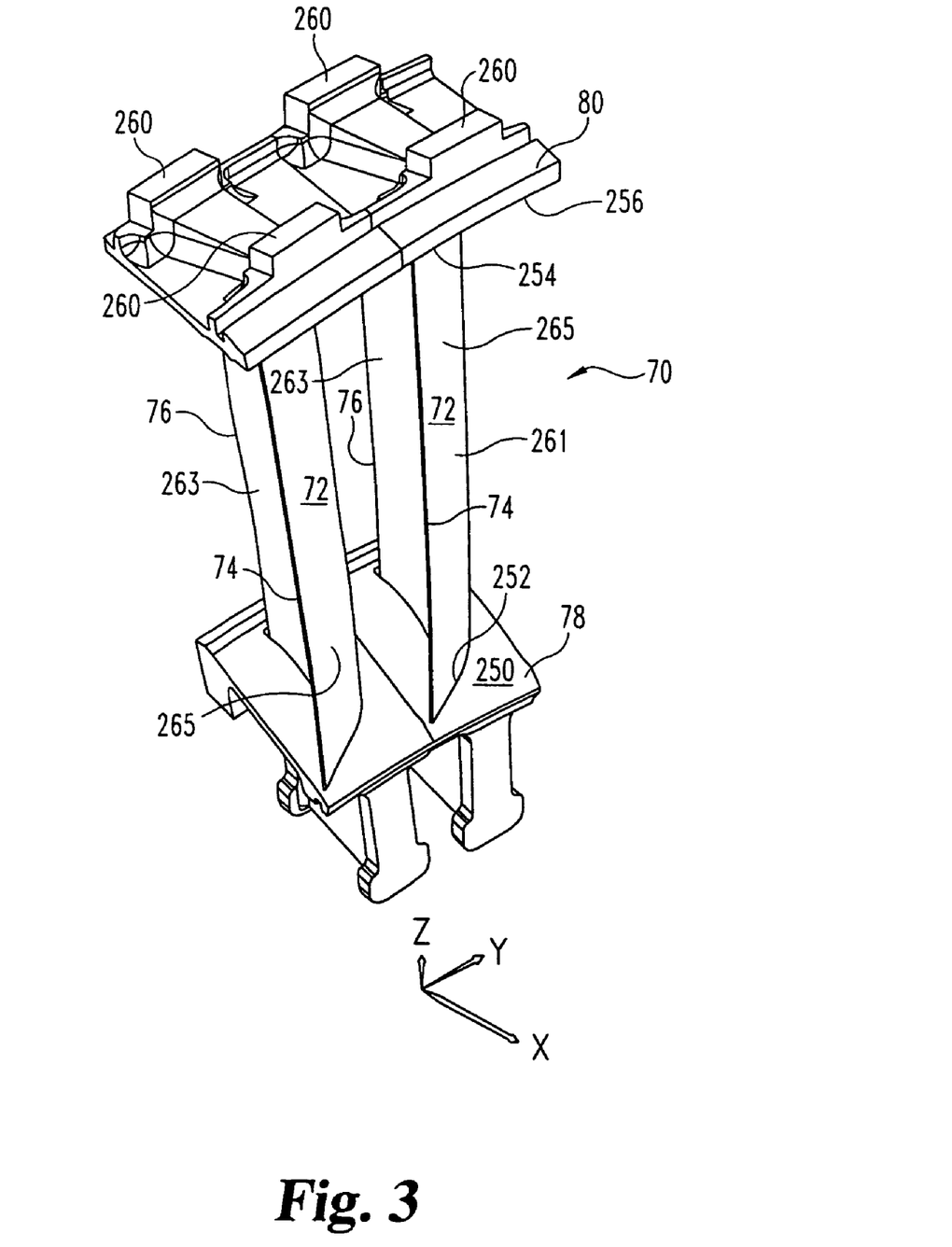
FIG. 3 is a perspective view of a second stage turbine nozzle guide vane segment illustrated in FIG. 2.
Figure 4:
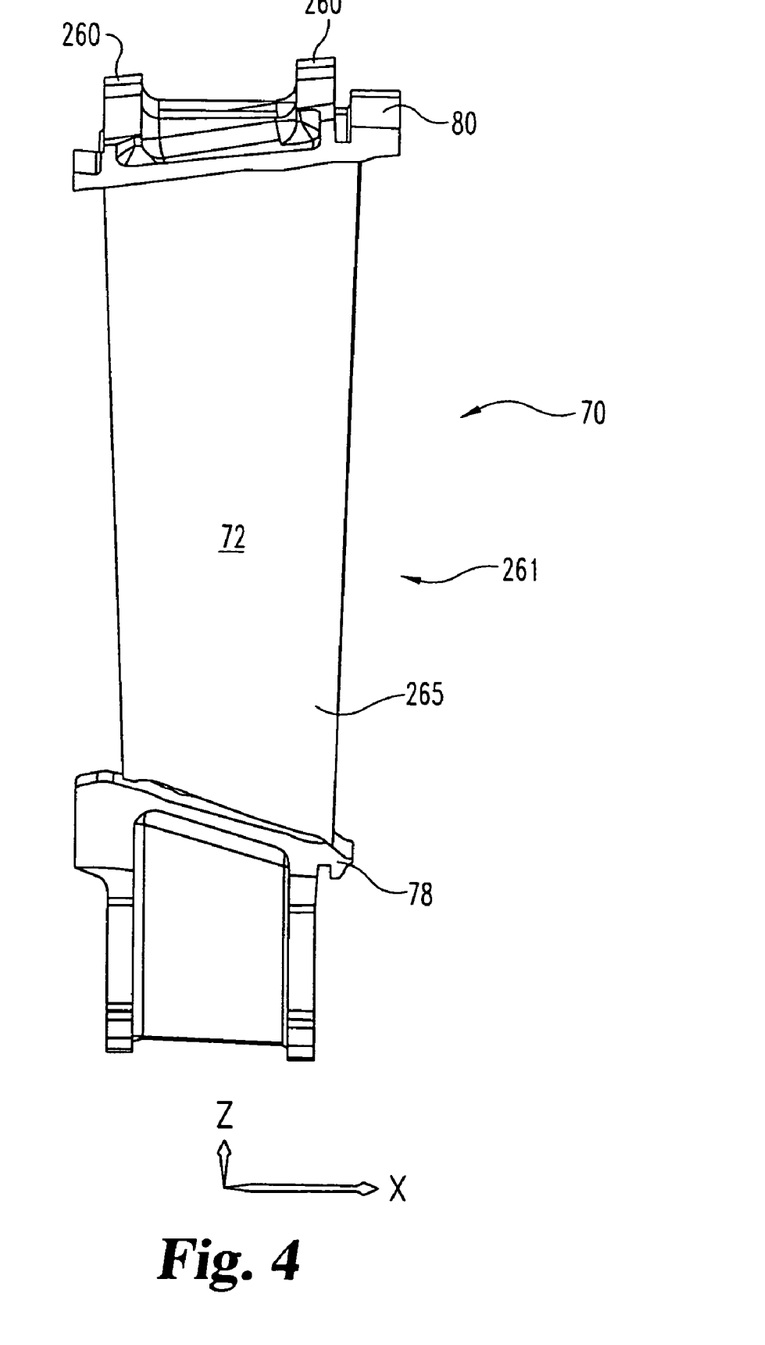
FIG. 4 is a front view of the second stage turbine nozzle guide vane segment illustrated in FIG. 3.
Figure 5:
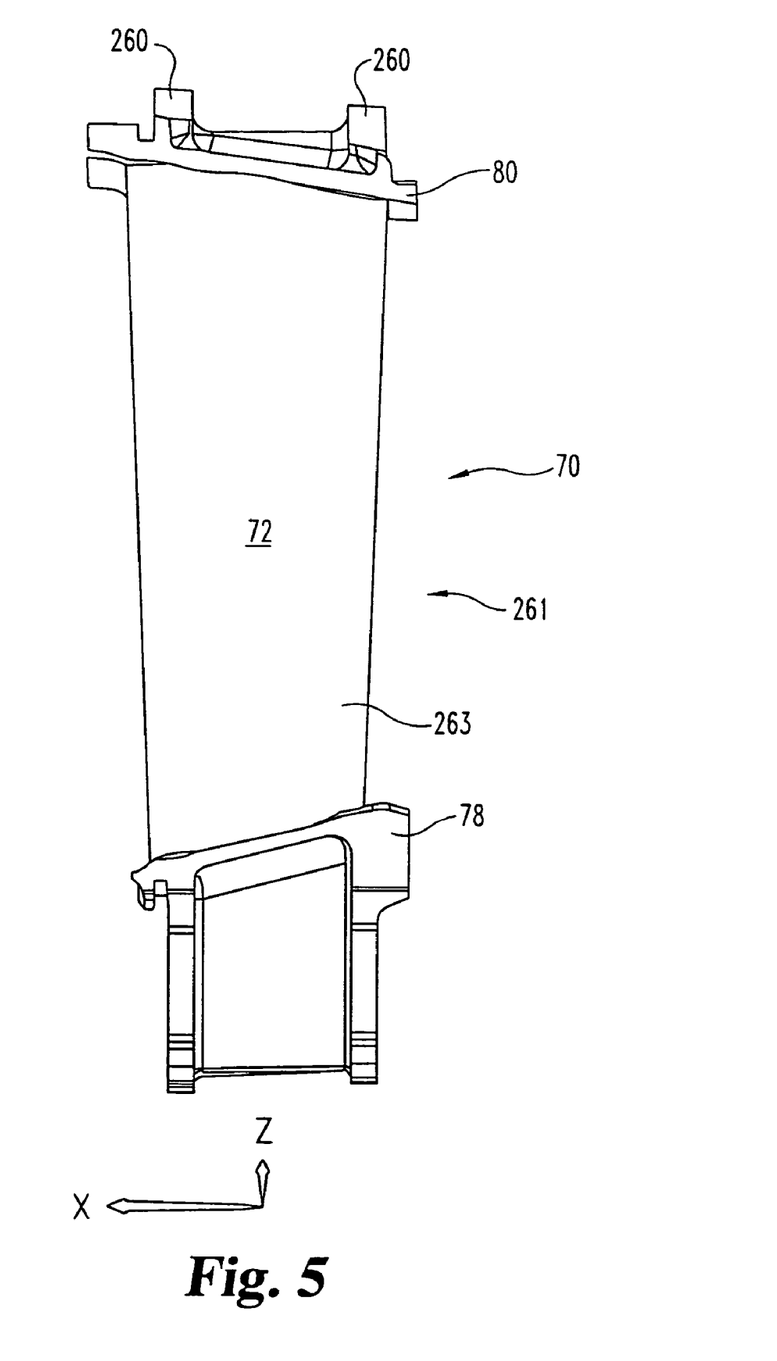
FIG. 5 is a back view of the second stage turbine nozzle guide vane segment illustrated in FIG. 3.
Figure 6:
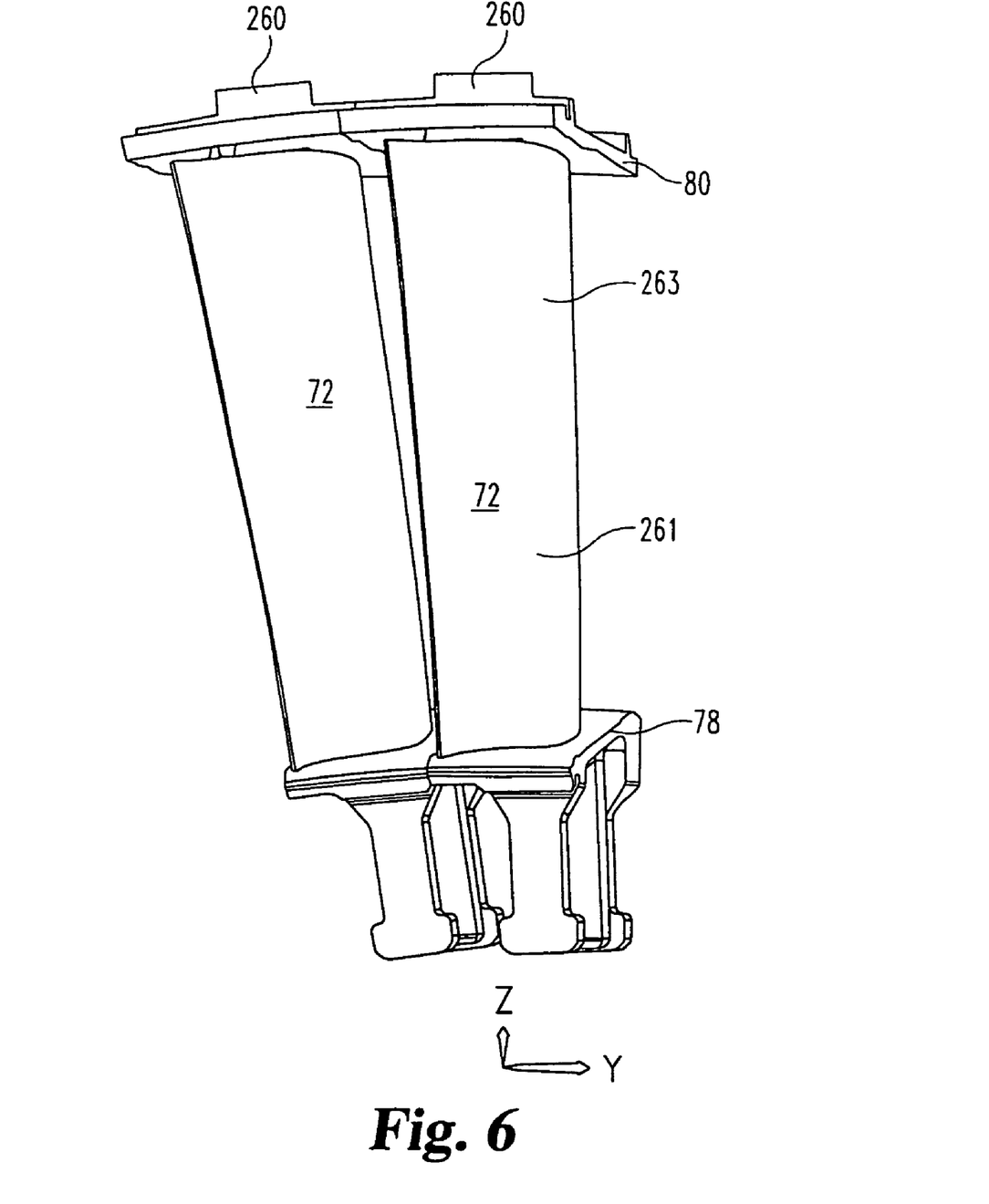
FIG. 6 is a right view of the second stage turbine nozzle guide vane segment illustrated in FIG. 3.
Figure 7:
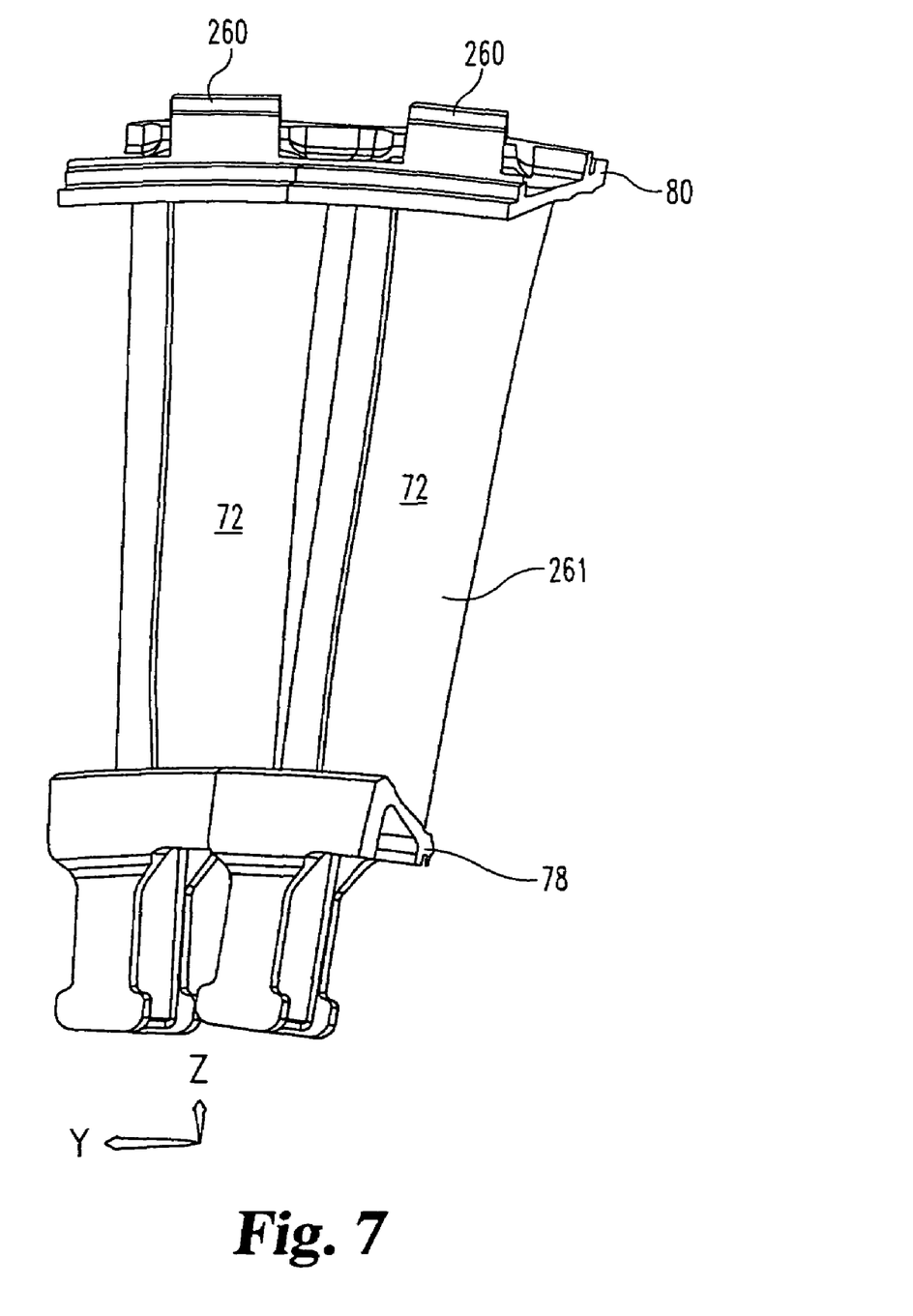
FIG. 7 is a left view of the second stage turbine nozzle guide vane segment illustrated in FIG. 3.
Figure 8:
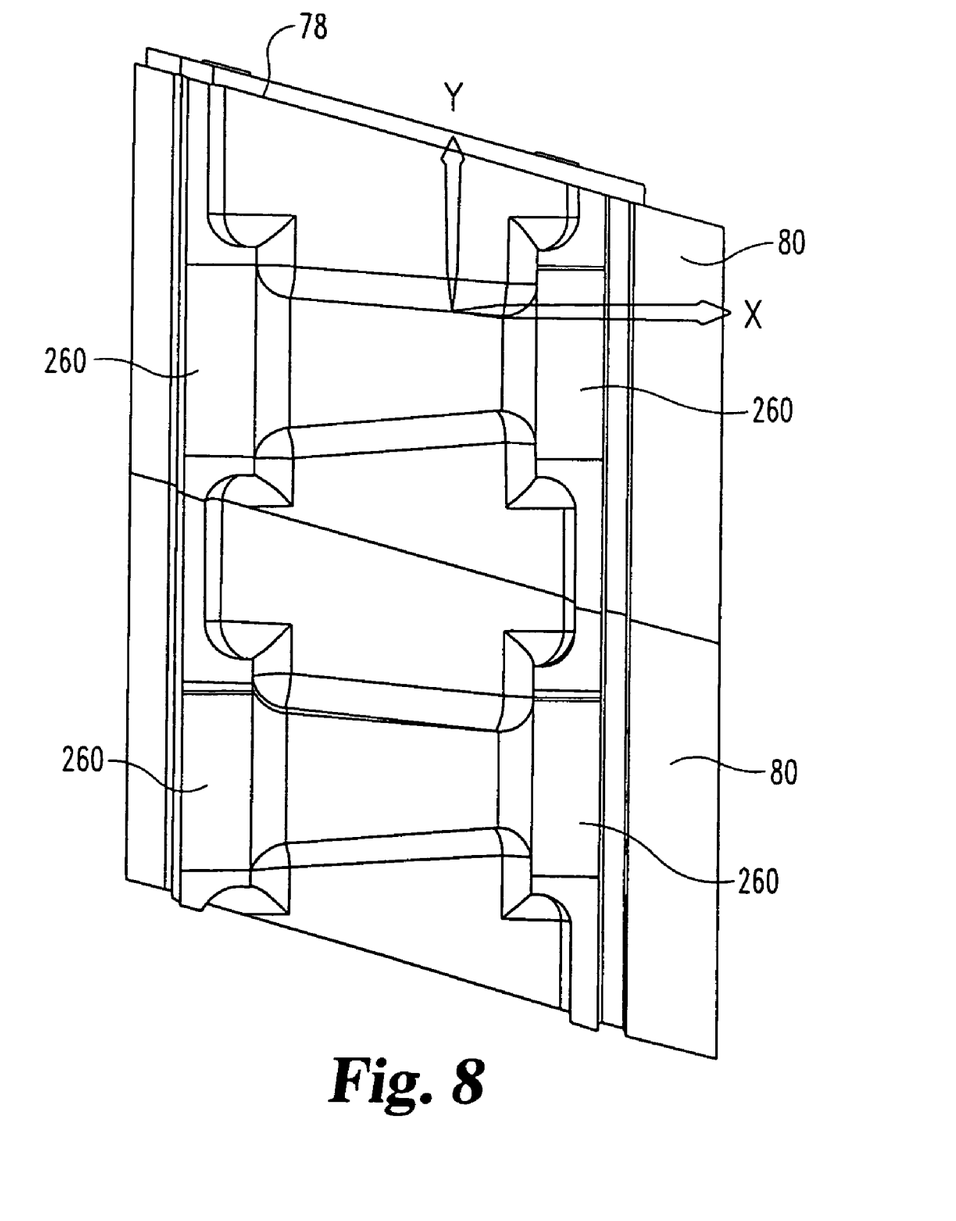
FIG. 8 is a top view of the second stage turbine nozzle guide vane segment illustrated in FIG. 3.
Figure 9:
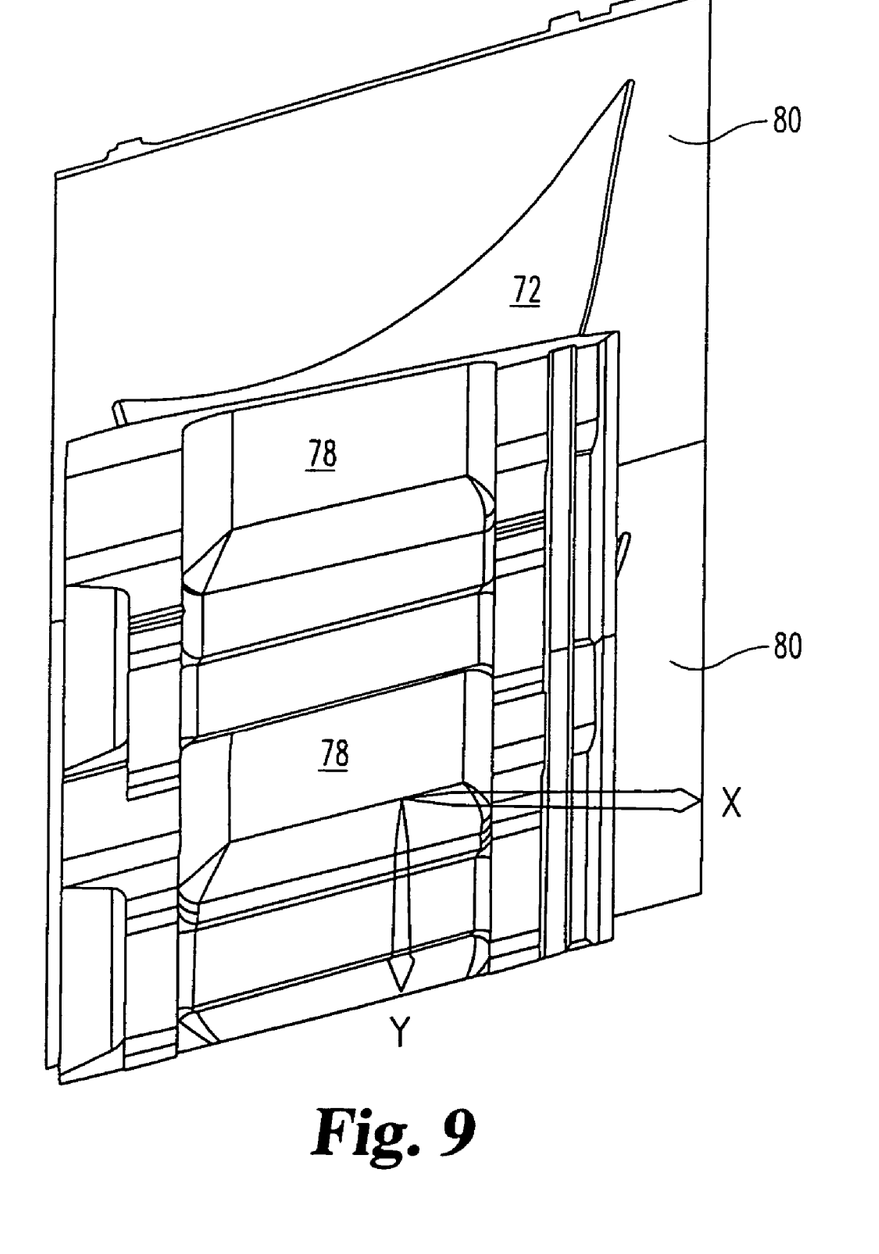
FIG. 9 is a bottom view of the second stage turbine nozzle guide vane segment illustrated in FIG. 3.

Referring now to FIG. 2, a partial cross section of the turbine section 18 is shown therein. As the working fluid exits the combustor section 16, the working fluid is constrained between an inner flow path wall 31 and an outer flow path wall 33 as it flows through the turbine section 18. The turbine section 18 includes a turbine inlet or first stage nozzle guide vane (NGV) assembly 30. The first stage NGV assembly 30 includes a plurality of static vanes or airfoils 32 positioned circumferentially around a flow path annulus of the engine 10. The first stage NGV assembly 30 is operable for accelerating and turning the flow of working fluid to a desired direction, as the working fluid exits the combustor section 16 and enters the turbine section 18.

Each airfoil 32 of the first stage NGV assembly 30 extends between a leading edge 34 and a trailing edge 36 in the stream wise direction and between an inner shroud 78 and an outer shroud 80 in the spanwise direction. It should be understood that the terms leading edge and trailing edge are defined relative to the general flow path of the working fluid, such that the working fluid first passes the leading edge and subsequently passes the trailing edge of a particular airfoil. The inner and outer shrouds 38, 40 form a portion of the inner and outer flow path walls 31, 33 respectively at that location in the engine 10.

The turbine section 18 further includes a first stage turbine assembly 42 positioned downstream of the first stage NGV assembly 30. The first stage turbine assembly 42 includes a first turbine wheel 44 which is comprised of a first turbine disk 46 having a plurality of first stage turbine blades 48 coupled thereto. It should be noted here that in one preferred embodiment the turbine blades 48 and the disk 46 can be separate components, but that the present invention contemplates other forms such as a turbine wheel having the blades and disk integrally formed together. This type of component is commonly called a "BLISK," short for a "Bladed Disk," by those working in the gas turbine engine industry.

Each turbine blade 48 includes an airfoil 50 that rotates with the turbine disk 46. Each airfoil 50 extends between a leading edge 52 and a trailing edge 54 in the stream wise direction and between an inner shroud or platform 56 and an outer shroud 58 in the spanwise direction. The disk 46 may include one or more seals 60 extending forward or aft in the streamwise direction. The seals 60, sometimes called rotating knife seals, limit the leakage of working fluid from the desired flowpath. The first stage turbine assembly 42 is operable for extracting energy from the working fluid via the airfoils 50 which in turn cause the turbine wheel 44 to rotate and drive the shaft 22.

Directly downstream of the first stage turbine assembly 42 is a second stage nozzle guide vane (NGV) assembly 70. The second stage NGV assembly 70 includes a plurality of static vanes or airfoils 72 positioned circumferentially around the flow path of the engine 10. The airfoils 72 of the second stage NGV assembly 70 are operable for accelerating and turning the working fluid flow to a desired direction as the working fluid exits the second stage NGV assembly 70. Each airfoil 72 extends between a leading edge 74 and a trailing edge 76 in the stream wise direction and between an inner shroud 78 and an outer shroud 80 in the spanwise direction. The inner and outer shrouds 78, 80 form a portion of the inner and outer flow path walls 31, 33 respectively at that location in the engine 10. The second stage nozzle guide vane (NGV) assembly 70 will be described in more detail below.

A second stage turbine assembly 82 is positioned downstream of the second stage NGV assembly 70. The second stage turbine assembly 82 includes a second turbine wheel 84 which is comprised of a second turbine disk 86 having a plurality of second stage turbine blades 88 coupled thereto. Each turbine blade 88 includes an airfoil 90 that rotates with the turbine disk 86 when the engine 10 is running. Each airfoil 90 extends between a leading edge 92 and a trailing edge 94 in the stream wise direction and between an inner shroud or platform 96 and an outer shroud 98 in the spanwise direction. The disk 86 may include one or more seals 100 extending forward or aft in the streamwise direction. In this particular embodiment of the invention, the second stage turbine assembly 82 is connected to the first stage turbine assembly 42 and therefore increases the power delivered to the shaft 22.

A third stage nozzle guide vane (NGV) assembly 110 is located downstream of the second stage turbine assembly 82. The third stage NGV assembly 110 includes a plurality of static vanes or airfoils 112 positioned circumferentially around the flowpath of the engine 10. The airfoils 112 of the third stage NGV assembly 110 are operable for accelerating and turning the working fluid flow to a desired direction as the working fluid exits the third stage NGV assembly 110. Each airfoil 112 extends between a leading edge 114 and a trailing edge 116 in the streamwise direction and between an inner shroud 118 and an outer shroud 120 in the spanwise direction. The inner and outer shrouds 118, 120 form a portion of the inner and outer flow path walls 31, 33 respectively at that location in the engine 10.

A third stage turbine assembly 130 is positioned downstream of the third stage NGV 110. The third stage turbine assembly 130 includes a third turbine wheel 132 which is comprised of a third turbine disk 134 having a plurality of third stage turbine blades 136 coupled thereto. Each turbine blade 136 includes an airfoil 138 that rotates with the turbine disk 134 when the engine 10 is running. Each airfoil 138 extends between a leading edge 140 and a trailing edge 142 in the stream wise direction and between an inner shroud or platform 144 and an outer shroud 146 in the spanwise direction. The third disk 134 may also include one or more seals 148 extending forward or aft of the disk 134 in the streamwise direction. Similar to the second stage turbine assembly 82, the third stage turbine assembly 130 is also connected to the first stage turbine assembly 42 and therefore further increases the power delivered to the shaft 22.

Although not shown in each of the drawings it should be understood the airfoils for both the turbine blades and turbine nozzle guide vanes may include internal cooling flow passages and apertures extending through portions of the external surfaces of the airfoil. Pressurized cooling fluid can then flow from the internal passages through the apertures to cool the external surface of the airfoils as would be known to those skilled in the art. In this manner, the engine 10 may be run at the higher turbine inlet temperatures, and thus produce higher thermal efficiencies while still providing adequate component life as measured by such parameters as high cycle fatigue limits, low cycle fatigue limits, and creep, etc.

It should be further noted that the airfoils may include coatings to increase component life. The coatings can be of the thermal barrier type and/or the radiation barrier type. Thermal barrier coatings have relatively low heat transfer coefficients which help to reduce the heat load that the cooling fluid is required to dissipate. Thermal barrier coatings are typically ceramic based and can include mullite and zirconia based composites, although other types of coatings are contemplated herein. Radiation barrier coatings operate to reduce radiation heat transfer to the coated component by having highly reflective external surfaces such that radiation emanating from the high temperature exhaust gas is at least partially reflected away and not absorbed by the component. Radiation barrier coatings can include materials from high temperature chromium based alloys as is known to those skilled in the art. The radiation barrier coatings and thermal barrier coatings can be used to coat the entire airfoil, but alternate embodiments include a partial coating and/or a coating with intermittent discontinuities formed therein.

Referring now to FIGS. 3 through 9, the second stage nozzle guide vane (NGV) assembly 70 will be described in more detail. As partially described previously, the second stage nozzle guide vane assembly 70 includes an inner shroud 78 wherein an outer surface 250 of the shroud defines a portion of the inner flow path wall 31 at that particular location in the engine 10. A plurality of airfoils 72 extend radially outward from the outer surface 250 of the shroud 78 from a hub 252 toward a tip 254. Each airfoil 72 is attached to the shroud 78 proximate the hub 252 of the airfoil 72. The airfoils 72 can be integrally formed with the shroud 78 through a casting process or the like or alternatively may be mechanically joined via welding, brazing or by any other joining method known to those skilled in the art. An outer shroud 80 can be attached to the airfoil 72 proximate the tip 254 of the airfoil 72. The outer shroud 80 includes an inner surface 256 which forms a portion of the outer flow path 33 in the turbine section 18. The second stage nozzle guide vane assembly 70 further includes an outer lug 260 positioned above each airfoil. The lugs 260 are operable for reacting torque loads produced by the airfoils 72 through the frame (not shown) of the aircraft engine 10

Each airfoil 72 includes an external surface 261 having first and second sides 263, 265 sometimes called pressure and suction sides respectively. The external surface 261 of the airfoil 72 provides aerodynamic control of the flow of working fluid so as to optimize efficiency in the turbine section 18. The external surface 261 of the airfoil 72 is substantially defined by Table 1 listed below. Table 1 lists data points in Cartesian coordinates that define the external surface of the airfoil 72 at discrete locations. The Z axis coordinates are generally measured radially outward from a reference location. In one form the reference location is the engine centerline axis, and in another form the reference location is the inner shroud 78 from the hub 252. The Z axis defines an imaginary stacking axis from which the contoured external surface is formed. The term "stacking axis," as it is typically used by aerodynamic design engineers, is nominally defined normal to the inner shroud 78 or in a radial direction from the axis of rotation, but in practice can "lean" or "tilt" in a desired direction to satisfy mechanical design criteria as is known to those skilled in the art. The lean or tilt angle is typically within 10°-25° of the normal plane in any direction relative to the inner shroud 78, but can vary with larger angles as necessary to satisfy design criteria. The X axis coordinates are generally measured normal to the stacking axis in a streamwise direction. The Y axis coordinates are generally measured normal to the stacking axis and normal to the X axis. The airfoil 72 defined by Table 1 improves the second stage turbine nozzle guide vane efficiency by 1.38% over prior art designs.

While the external surface of airfoil 72 is defined by discrete points, the surface can be "smoothed" between these discrete points by parametric spline fit techniques and the like. One such method called numerical uniform rational B-spline (NURB-S) is employed by software run on Unigraphics® computer aided design workstations. The data splines can be formed in the streamwise direction and or the spanwise direction of the airfoil 72. Other surface smoothing techniques known to those skilled in the art are also contemplated by the present invention.

The airfoils of the present invention can be formed from any manufacturing process known to those skilled in the art. One such process is an investment casting method whereby the entire second stage NGV assembly 70 is integrally cast as a one-piece component. Alternatively the second stage NGV assembly 70 can be formed in multiple pieces and bonded together. In another form the second stage NGV assembly 70 can be formed from wrought material and finished machined to a desired specification.

The present invention includes airfoils having an external surface formed within a manufacturing tolerance of +/−0.025 inches with respect to any particular point in Table 1 or spline curve between discrete points. Furthermore, if the airfoil of the present invention has a material coating applied, the tolerance band will be increased to +/−0.050 inches.

TABLE 1

Coordinates for airfoils on the second stage nozzle guide vane (in).

A. Section height 10.50

| | | |
|---|---|---|
| X1 = 0.57279 | Y1 = −0.48502 | Z1 = 10.50000 |
| X2 = 0.54881 | Y2 = −0.42762 | Z2 = 10.50000 |
| X3 = 0.52390 | Y3 = −0.37061 | Z3 = 10.50000 |
| X4 = 0.49875 | Y4 = −0.31371 | Z4 = 10.50000 |
| X5 = 0.47333 | Y5 = −0.25693 | Z5 = 10.50000 |
| X6 = 0.44753 | Y6 = −0.20032 | Z6 = 10.50000 |
| X7 = 0.42123 | Y7 = −0.14394 | Z7 = 10.50000 |
| X8 = 0.39435 | Y8 = −0.08784 | Z8 = 10.50000 |
| X9 = 0.36672 | Y9 = −0.03210 | Z9 = 10.50000 |
| X10 = 0.33809 | Y10 = 0.02313 | Z10 = 10.50000 |
| X11 = 0.30813 | Y11 = 0.07766 | Z11 = 10.50000 |
| X12 = 0.27642 | Y12 = 0.13118 | Z12 = 10.50000 |
| X13 = 0.24254 | Y13 = 0.18334 | Z13 = 10.50000 |
| X14 = 0.20620 | Y14 = 0.23383 | Z14 = 10.50000 |
| X15 = 0.16726 | Y15 = 0.28234 | Z15 = 10.50000 |
| X16 = 0.12565 | Y16 = 0.32857 | Z16 = 10.50000 |
| X17 = 0.08142 | Y17 = 0.37231 | Z17 = 10.50000 |
| X18 = 0.03458 | Y18 = 0.41324 | Z18 = 10.50000 |
| X19 = −0.01492 | Y19 = 0.45090 | Z19 = 10.50000 |
| X20 = −0.06719 | Y20 = 0.48460 | Z20 = 10.50000 |
| X21 = 0.57279 | Y21 = −0.48502 | Z21 = 10.50000 |
| X22 = 0.57317 | Y22 = −0.49501 | Z22 = 10.50000 |
| X23 = 0.56691 | Y23 = −0.50291 | Z23 = 10.50000 |
| X24 = 0.55707 | Y24 = −0.50454 | Z24 = 10.50000 |
| X25 = 0.54874 | Y25 = −0.49898 | Z25 = 10.50000 |
| X26 = −0.03935 | Y26 = 0.09023 | Z26 = 10.50000 |
| X27 = 0.00130 | Y27 = 0.07209 | Z27 = 10.50000 |
| X28 = 0.04100 | Y28 = 0.05195 | Z28 = 10.50000 |
| X29 = 0.07957 | Y29 = 0.02974 | Z29 = 10.50000 |
| X30 = 0.11680 | Y30 = 0.00536 | Z30 = 10.50000 |
| X31 = 0.15258 | Y31 = −0.02113 | Z31 = 10.50000 |
| X32 = 0.18689 | Y32 = −0.04948 | Z32 = 10.50000 |
| X33 = 0.21979 | Y33 = −0.07946 | Z33 = 10.50000 |
| X34 = 0.25139 | Y34 = −0.11081 | Z34 = 10.50000 |
| X35 = 0.28187 | Y35 = −0.14325 | Z35 = 10.50000 |
| X36 = 0.31142 | Y36 = −0.17654 | Z36 = 10.50000 |
| X37 = 0.34017 | Y37 = −0.21052 | Z37 = 10.50000 |
| X38 = 0.36817 | Y38 = −0.24513 | Z38 = 10.50000 |
| X39 = 0.39546 | Y39 = −0.28030 | Z39 = 10.50000 |
| X40 = 0.42207 | Y40 = −0.31598 | Z40 = 10.50000 |
| X41 = 0.44807 | Y41 = −0.35212 | Z41 = 10.50000 |
| X42 = 0.47345 | Y42 = −0.38869 | Z42 = 10.50000 |
| X43 = 0.49838 | Y43 = −0.42556 | Z43 = 10.50000 |

TABLE 1-continued

Coordinates for airfoils on the second stage nozzle guide vane (in).

| | | |
|---|---|---|
| X44 = 0.52331 | Y44 = −0.46244 | Z44 = 10.50000 |
| X45 = 0.54874 | Y45 = −0.49898 | Z45 = 10.50000 |
| B. Section height 11.00 | | |
| X1 = −0.81291 | Y1 = 0.29949 | Z1 = 11.00000 |
| X2 = −0.81537 | Y2 = 0.29253 | Z2 = 11.00000 |
| X3 = −0.81609 | Y3 = 0.28516 | Z3 = 11.00000 |
| X4 = −0.81510 | Y4 = 0.27782 | Z4 = 11.00000 |
| X5 = −0.81229 | Y5 = 0.27099 | Z5 = 11.00000 |
| X6 = −0.76311 | Y6 = 0.37548 | Z6 = 11.00000 |
| X7 = −0.77736 | Y7 = 0.35775 | Z7 = 11.00000 |
| X8 = −0.79049 | Y8 = 0.33910 | Z8 = 11.00000 |
| X9 = −0.80229 | Y9 = 0.31963 | Z9 = 11.00000 |
| X10 = −0.81291 | Y10 = 0.29949 | Z10 = 11.00000 |
| X11 = 0.58996 | Y11 = −0.51146 | Z11 = 11.00000 |
| X12 = 0.55083 | Y12 = −0.41509 | Z12 = 11.00000 |
| X13 = 0.50917 | Y13 = −0.31980 | Z13 = 11.00000 |
| X14 = 0.46596 | Y14 = −0.22516 | Z14 = 11.00000 |
| X15 = 0.42109 | Y15 = −0.13134 | Z15 = 11.00000 |
| X16 = 0.37401 | Y16 = −0.03861 | Z16 = 11.00000 |
| X17 = 0.32379 | Y17 = 0.05249 | Z17 = 11.00000 |
| X18 = 0.26922 | Y18 = 0.14104 | Z18 = 11.00000 |
| X19 = 0.20908 | Y19 = 0.22586 | Z19 = 11.00000 |
| X20 = 0.14243 | Y20 = 0.30564 | Z20 = 11.00000 |
| X21 = 0.06867 | Y21 = 0.37896 | Z21 = 11.00000 |
| X22 = −0.01258 | Y22 = 0.44382 | Z22 = 11.00000 |
| X23 = −0.10155 | Y23 = 0.49750 | Z23 = 11.00000 |
| X24 = −0.19771 | Y24 = 0.53683 | Z24 = 11.00000 |
| X25 = −0.29925 | Y25 = 0.55874 | Z25 = 11.00000 |
| X26 = −0.40307 | Y26 = 0.56130 | Z26 = 11.00000 |
| X27 = −0.50531 | Y27 = 0.54324 | Z27 = 11.00000 |
| X28 = −0.60177 | Y28 = 0.50474 | Z28 = 11.00000 |
| X29 = −0.68867 | Y29 = 0.44794 | Z29 = 11.00000 |
| X30 = −0.76311 | Y30 = 0.37548 | Z30 = 11.00000 |
| X31 = 0.58996 | Y31 = −0.51146 | Z31 = 11.00000 |
| X32 = 0.59013 | Y32 = −0.52055 | Z32 = 11.00000 |
| X33 = 0.58429 | Y33 = −0.52761 | Z33 = 11.00000 |
| X34 = 0.57533 | Y34 = −0.52900 | Z34 = 11.00000 |
| X35 = 0.56778 | Y35 = −0.52389 | Z35 = 11.00000 |
| X36 = 0.56778 | Y36 = −0.52389 | Z36 = 11.00000 |
| X37 = 0.52010 | Y37 = −0.45446 | Z37 = 11.00000 |
| X38 = 0.47225 | Y38 = −0.38515 | Z38 = 11.00000 |
| X39 = 0.42217 | Y39 = −0.31744 | Z39 = 11.00000 |
| X40 = 0.36951 | Y40 = −0.25172 | Z40 = 11.00000 |
| X41 = 0.31410 | Y41 = −0.18830 | Z41 = 11.00000 |
| X42 = 0.25579 | Y42 = −0.12754 | Z42 = 11.00000 |
| X43 = 0.19409 | Y43 = −0.07023 | Z43 = 11.00000 |
| X44 = 0.12858 | Y44 = −0.01732 | Z44 = 11.00000 |
| X45 = 0.05921 | Y45 = 0.03040 | Z45 = 11.00000 |
| X46 = −0.01368 | Y46 = 0.07257 | Z46 = 11.00000 |
| X47 = −0.08949 | Y47 = 0.10920 | Z47 = 11.00000 |
| X48 = −0.16789 | Y48 = 0.13994 | Z48 = 11.00000 |
| X49 = −0.24828 | Y49 = 0.16502 | Z49 = 11.00000 |
| X50 = −0.33002 | Y50 = 0.18525 | Z50 = 11.00000 |
| X51 = −0.41284 | Y51 = 0.20049 | Z51 = 11.00000 |
| X52 = −0.49637 | Y52 = 0.21124 | Z52 = 11.00000 |
| X53 = −0.58025 | Y53 = 0.21881 | Z53 = 11.00000 |
| X54 = −0.66418 | Y54 = 0.22583 | Z54 = 11.00000 |
| X55 = −0.74734 | Y55 = 0.23859 | Z55 = 11.00000 |
| X56 = −0.74734 | Y56 = 0.23859 | Z56 = 11.00000 |
| X57 = −0.76512 | Y57 = 0.24383 | Z57 = 11.00000 |
| X58 = −0.78246 | Y58 = 0.25024 | Z58 = 11.00000 |
| X59 = −0.79923 | Y59 = 0.25819 | Z59 = 11.00000 |
| X60 = −0.81229 | Y60 = 0.27099 | Z60 = 11.00000 |
| C. Section height 11.50 | | |
| X1 = −0.83058 | Y1 = 0.31646 | Z1 = 11.50000 |
| X2 = −0.83170 | Y2 = 0.30851 | Z2 = 11.50000 |
| X3 = −0.83047 | Y3 = 0.30059 | Z3 = 11.50000 |
| X4 = −0.82703 | Y4 = 0.29333 | Z4 = 11.50000 |
| X5 = −0.82150 | Y5 = 0.28753 | Z5 = 11.50000 |
| X6 = −0.77969 | Y6 = 0.39445 | Z6 = 11.50000 |
| X7 = −0.79507 | Y7 = 0.37677 | Z7 = 11.50000 |
| X8 = −0.80899 | Y8 = 0.35792 | Z8 = 11.50000 |
| X9 = −0.82111 | Y9 = 0.33785 | Z9 = 11.50000 |
| X10 = −0.83058 | Y10 = 0.31646 | Z10 = 11.50000 |
| X11 = 0.60695 | Y11 = −0.54228 | Z11 = 11.50000 |
| X12 = 0.56820 | Y12 = −0.44357 | Z12 = 11.50000 |
| X13 = 0.52607 | Y13 = −0.34625 | Z13 = 11.50000 |
| X14 = 0.48190 | Y14 = −0.24983 | Z14 = 11.50000 |
| X15 = 0.43580 | Y15 = −0.15432 | Z15 = 11.50000 |
| X16 = 0.38714 | Y16 = −0.06010 | Z16 = 11.50000 |
| X17 = 0.33516 | Y17 = 0.03234 | Z17 = 11.50000 |
| X18 = 0.27900 | Y18 = 0.12229 | Z18 = 11.50000 |
| X19 = 0.21777 | Y19 = 0.20887 | Z19 = 11.50000 |
| X20 = 0.15045 | Y20 = 0.29077 | Z20 = 11.50000 |
| X21 = 0.07602 | Y21 = 0.36626 | Z21 = 11.50000 |
| X22 = −0.00627 | Y22 = 0.43306 | Z22 = 11.50000 |
| X23 = −0.09659 | Y23 = 0.48850 | Z23 = 11.50000 |
| X24 = −0.19406 | Y24 = 0.52997 | Z24 = 11.50000 |
| X25 = −0.29698 | Y25 = 0.55508 | Z25 = 11.50000 |
| X26 = −0.40265 | Y26 = 0.56225 | Z26 = 11.50000 |
| X27 = −0.50780 | Y27 = 0.54970 | Z27 = 11.50000 |
| X28 = −0.60852 | Y28 = 0.51710 | Z28 = 11.50000 |
| X29 = −0.70059 | Y29 = 0.46480 | Z29 = 11.50000 |
| X30 = −0.77969 | Y30 = 0.39445 | Z30 = 11.50000 |
| X31 = 0.60695 | Y31 = −0.54228 | Z31 = 11.50000 |
| X32 = 0.60698 | Y32 = −0.55064 | Z32 = 11.50000 |
| X33 = 0.60146 | Y33 = −0.55702 | Z33 = 11.50000 |
| X34 = 0.59319 | Y34 = −0.55816 | Z34 = 11.50000 |
| X35 = 0.58628 | Y35 = −0.55339 | Z35 = 11.50000 |
| X36 = 0.58628 | Y36 = −0.55339 | Z36 = 11.50000 |
| X37 = 0.53740 | Y37 = −0.48206 | Z37 = 11.50000 |
| X38 = 0.48813 | Y38 = −0.41100 | Z38 = 11.50000 |
| X39 = 0.43628 | Y39 = −0.34181 | Z39 = 11.50000 |
| X40 = 0.38154 | Y40 = −0.27487 | Z40 = 11.50000 |
| X41 = 0.32384 | Y41 = −0.21048 | Z41 = 11.50000 |
| X42 = 0.26309 | Y42 = −0.14896 | Z42 = 11.50000 |
| X43 = 0.19931 | Y43 = −0.09058 | Z43 = 11.50000 |
| X44 = 0.13253 | Y44 = −0.03566 | Z44 = 11.50000 |
| X45 = 0.06282 | Y45 = 0.01548 | Z45 = 11.50000 |
| X46 = −0.00965 | Y46 = 0.06264 | Z46 = 11.50000 |
| X47 = −0.08468 | Y47 = 0.10560 | Z47 = 11.50000 |
| X48 = −0.16218 | Y48 = 0.14392 | Z48 = 11.50000 |
| X49 = −0.24197 | Y49 = 0.17722 | Z49 = 11.50000 |
| X50 = −0.32373 | Y50 = 0.20533 | Z50 = 11.50000 |
| X51 = −0.40720 | Y51 = 0.22780 | Z51 = 11.50000 |
| X52 = −0.49210 | Y52 = 0.24419 | Z52 = 11.50000 |
| X53 = −0.57791 | Y53 = 0.25466 | Z53 = 11.50000 |
| X54 = −0.66421 | Y54 = 0.26019 | Z54 = 11.50000 |
| X55 = −0.75045 | Y55 = 0.26608 | Z55 = 11.50000 |
| X56 = −0.75045 | Y56 = 0.26608 | Z56 = 11.50000 |
| X57 = −0.76892 | Y57 = 0.26907 | Z57 = 11.50000 |
| X58 = −0.78721 | Y58 = 0.27313 | Z58 = 11.50000 |
| X59 = −0.80509 | Y59 = 0.27862 | Z59 = 11.50000 |
| X60 = −0.82150 | Y60 = 0.28753 | Z60 = 11.50000 |
| D. Section height 12.00 | | |
| X1 = −0.83355 | Y1 = 0.28533 | Z1 = 12.00000 |
| X2 = −0.84083 | Y2 = 0.29029 | Z2 = 12.00000 |
| X3 = −0.84600 | Y3 = 0.29743 | Z3 = 12.00000 |
| X4 = −0.84864 | Y4 = 0.30582 | Z4 = 12.00000 |
| X5 = −0.84843 | Y5 = 0.31464 | Z5 = 12.00000 |
| X6 = −0.84843 | Y6 = 0.31464 | Z6 = 12.00000 |
| X7 = −0.83991 | Y7 = 0.33668 | Z7 = 12.00000 |
| X8 = −0.82773 | Y8 = 0.35705 | Z8 = 12.00000 |
| X9 = −0.81596 | Y9 = 0.37596 | Z9 = 12.00000 |
| X10 = −0.79759 | Y10 = 0.39363 | Z10 = 12.00000 |
| X11 = −0.79759 | Y11 = 0.39363 | Z11 = 12.00000 |
| X12 = −0.71494 | Y12 = 0.46382 | Z12 = 12.00000 |
| X13 = −0.61911 | Y13 = 0.51468 | Z13 = 12.00000 |
| X14 = −0.51501 | Y14 = 0.54513 | Z14 = 12.00000 |
| X15 = −0.40701 | Y15 = 0.55563 | Z15 = 12.00000 |
| X16 = −0.29890 | Y16 = 0.54631 | Z16 = 12.00000 |
| X17 = −0.19384 | Y17 = 0.51906 | Z17 = 12.00000 |
| X18 = −0.09445 | Y18 = 0.47541 | Z18 = 12.00000 |
| X19 = −0.00243 | Y19 = 0.41779 | Z19 = 12.00000 |
| X20 = 0.08135 | Y20 = 0.34870 | Z20 = 12.00000 |
| X21 = 0.15711 | Y21 = 0.27088 | Z21 = 12.00000 |
| X22 = 0.22565 | Y22 = 0.18660 | Z22 = 12.00000 |
| X23 = 0.28800 | Y23 = 0.09764 | Z23 = 12.00000 |
| X24 = 0.34530 | Y24 = 0.00533 | Z24 = 12.00000 |
| X25 = 0.39844 | Y25 = −0.08944 | Z25 = 12.00000 |
| X26 = 0.44819 | Y26 = −0.18603 | Z26 = 12.00000 |

TABLE 1-continued

Coordinates for airfoils on the second stage nozzle guide vane (in).

| | | |
|---|---|---|
| X27 = 0.49528 | Y27 = −0.28395 | Z27 = 12.00000 |
| X28 = 0.54044 | Y28 = −0.38278 | Z28 = 12.00000 |
| X29 = 0.58365 | Y29 = −0.48247 | Z29 = 12.00000 |
| X30 = 0.62351 | Y30 = −0.58354 | Z30 = 12.00000 |
| X31 = 0.62351 | Y31 = −0.58354 | Z31 = 12.00000 |
| X32 = 0.62353 | Y32 = −0.59160 | Z32 = 12.00000 |
| X33 = 0.61813 | Y33 = −0.59769 | Z33 = 12.00000 |
| X34 = 0.61014 | Y34 = −0.59872 | Z34 = 12.00000 |
| X35 = 0.60349 | Y35 = −0.59409 | Z35 = 12.00000 |
| X36 = 0.60349 | Y36 = −0.59409 | Z36 = 12.00000 |
| X37 = 0.55235 | Y37 = −0.51900 | Z37 = 12.00000 |
| X38 = 0.50002 | Y38 = −0.44474 | Z38 = 12.00000 |
| X39 = 0.44561 | Y39 = −0.37199 | Z39 = 12.00000 |
| X40 = 0.38805 | Y40 = −0.30171 | Z40 = 12.00000 |
| X41 = 0.32709 | Y41 = −0.23437 | Z41 = 12.00000 |
| X42 = 0.26292 | Y42 = −0.17007 | Z42 = 12.00000 |
| X43 = 0.19560 | Y43 = −0.10908 | Z43 = 12.00000 |
| X44 = 0.12534 | Y44 = −0.05150 | Z44 = 12.00000 |
| X45 = 0.05247 | Y45 = 0.00274 | Z45 = 12.00000 |
| X46 = −0.02291 | Y46 = 0.05344 | Z46 = 12.00000 |
| X47 = −0.10079 | Y47 = 0.10021 | Z47 = 12.00000 |
| X48 = −0.18124 | Y48 = 0.14237 | Z48 = 12.00000 |
| X49 = −0.26424 | Y49 = 0.17928 | Z49 = 12.00000 |
| X50 = −0.34959 | Y50 = 0.21035 | Z50 = 12.00000 |
| X51 = −0.43701 | Y51 = 0.23499 | Z51 = 12.00000 |
| X52 = −0.52608 | Y52 = 0.25277 | Z52 = 12.00000 |
| X53 = −0.61628 | Y53 = 0.26347 | Z53 = 12.00000 |
| X54 = −0.70698 | Y54 = 0.26836 | Z54 = 12.00000 |
| X55 = −0.79753 | Y55 = 0.27490 | Z55 = 12.00000 |
| X56 = −0.79753 | Y56 = 0.27490 | Z56 = 12.00000 |
| X57 = −0.80676 | Y57 = 0.27670 | Z57 = 12.00000 |
| X58 = −0.81588 | Y58 = 0.27896 | Z58 = 12.00000 |
| X59 = −0.82484 | Y59 = 0.28180 | Z59 = 12.00000 |
| X60 = −0.83355 | Y60 = 0.28533 | Z60 = 12.00000 |

E. Section height 12.50

| | | |
|---|---|---|
| X1 = −0.86654 | Y1 = 0.28260 | Z1 = 12.50000 |
| X2 = −0.86645 | Y2 = 0.27361 | Z2 = 12.50000 |
| X3 = −0.86340 | Y3 = 0.26516 | Z3 = 12.50000 |
| X4 = −0.85779 | Y4 = 0.25812 | Z4 = 12.50000 |
| X5 = −0.85014 | Y5 = 0.25341 | Z5 = 12.50000 |
| X6 = −0.86654 | Y6 = 0.28260 | Z6 = 12.50000 |
| X7 = −0.85882 | Y7 = 0.30440 | Z7 = 12.50000 |
| X8 = −0.84725 | Y8 = 0.32453 | Z8 = 12.50000 |
| X9 = −0.83373 | Y9 = 0.34340 | Z9 = 12.50000 |
| X10 = −0.81872 | Y10 = 0.36112 | Z10 = 12.50000 |
| X11 = −0.81872 | Y11 = 0.36112 | Z11 = 12.50000 |
| X12 = −0.73552 | Y12 = 0.43566 | Z12 = 12.50000 |
| X13 = −0.63840 | Y13 = 0.49099 | Z13 = 12.50000 |
| X14 = −0.53223 | Y14 = 0.52585 | Z14 = 12.50000 |
| X15 = −0.42132 | Y15 = 0.53971 | Z15 = 12.50000 |
| X16 = −0.30981 | Y16 = 0.53205 | Z16 = 12.50000 |
| X17 = −0.20139 | Y17 = 0.50473 | Z17 = 12.50000 |
| X18 = −0.09901 | Y18 = 0.45974 | Z18 = 12.50000 |
| X19 = −0.00437 | Y19 = 0.40013 | Z19 = 12.50000 |
| X20 = 0.08187 | Y20 = 0.32886 | Z20 = 12.50000 |
| X21 = 0.16006 | Y21 = 0.24879 | Z21 = 12.50000 |
| X22 = 0.23077 | Y22 = 0.16207 | Z22 = 12.50000 |
| X23 = 0.29477 | Y23 = 0.07024 | Z23 = 12.50000 |
| X24 = 0.35322 | Y24 = −0.02522 | Z24 = 12.50000 |
| X25 = 0.40736 | Y25 = −0.12319 | Z25 = 12.50000 |
| X26 = 0.45814 | Y26 = −0.22295 | Z26 = 12.50000 |
| X27 = 0.50630 | Y27 = −0.32400 | Z27 = 12.50000 |
| X28 = 0.55266 | Y28 = −0.42589 | Z28 = 12.50000 |
| X29 = 0.59759 | Y29 = −0.52842 | Z29 = 12.50000 |
| X30 = 0.63979 | Y30 = −0.63209 | Z30 = 12.50000 |
| X31 = 0.63979 | Y31 = −0.63209 | Z31 = 12.50000 |
| X32 = 0.63987 | Y32 = −0.64018 | Z32 = 12.50000 |
| X33 = 0.63444 | Y33 = −0.64631 | Z33 = 12.50000 |
| X34 = 0.62642 | Y34 = −0.64736 | Z34 = 12.50000 |
| X35 = 0.61972 | Y35 = −0.64274 | Z35 = 12.50000 |
| X36 = 0.61971 | Y36 = −0.64274 | Z36 = 12.50000 |
| X37 = 0.56692 | Y37 = −0.56632 | Z37 = 12.50000 |
| X38 = 0.51372 | Y38 = −0.49018 | Z38 = 12.50000 |
| X39 = 0.45843 | Y39 = −0.41556 | Z39 = 12.50000 |
| X40 = 0.40030 | Y40 = −0.34312 | Z40 = 12.50000 |
| X41 = 0.33894 | Y41 = −0.27341 | Z41 = 12.50000 |
| X42 = 0.27412 | Y42 = −0.20690 | Z42 = 12.50000 |
| X43 = 0.20585 | Y43 = −0.14393 | Z43 = 12.50000 |
| X44 = 0.13435 | Y44 = −0.08466 | Z44 = 12.50000 |
| X45 = 0.06001 | Y45 = −0.02900 | Z45 = 12.50000 |
| X46 = −0.01704 | Y46 = 0.02286 | Z46 = 12.50000 |
| X47 = −0.09684 | Y47 = 0.07037 | Z47 = 12.50000 |
| X48 = −0.17951 | Y48 = 0.11267 | Z48 = 12.50000 |
| X49 = −0.26497 | Y49 = 0.14900 | Z49 = 12.50000 |
| X50 = −0.35286 | Y50 = 0.17899 | Z50 = 12.50000 |
| X51 = −0.44276 | Y51 = 0.20222 | Z51 = 12.50000 |
| X52 = −0.53412 | Y52 = 0.21889 | Z52 = 12.50000 |
| X53 = −0.62631 | Y53 = 0.23009 | Z53 = 12.50000 |
| X54 = −0.71893 | Y54 = 0.23698 | Z54 = 12.50000 |
| X55 = −0.81156 | Y55 = 0.24359 | Z55 = 12.50000 |
| X56 = −0.81156 | Y56 = 0.24359 | Z56 = 12.50000 |
| X57 = −0.82141 | Y57 = 0.24521 | Z57 = 12.50000 |
| X58 = −0.83116 | Y58 = 0.24732 | Z58 = 12.50000 |
| X59 = −0.84076 | Y59 = 0.25002 | Z59 = 12.50000 |
| X60 = −0.85014 | Y60 = 0.25341 | Z60 = 12.50000 |

F. Section height 13.00

| | | |
|---|---|---|
| X1 = −0.88469 | Y1 = 0.24061 | Z1 = 13.00000 |
| X2 = −0.88451 | Y2 = 0.23189 | Z2 = 13.00000 |
| X3 = −0.88152 | Y3 = 0.22371 | Z3 = 13.00000 |
| X4 = −0.87611 | Y4 = 0.21686 | Z4 = 13.00000 |
| X5 = −0.86876 | Y5 = 0.21218 | Z5 = 13.00000 |
| X6 = −0.83409 | Y6 = 0.32650 | Z6 = 13.00000 |
| X7 = −0.85000 | Y7 = 0.30700 | Z7 = 13.00000 |
| X8 = −0.86441 | Y8 = 0.28635 | Z8 = 13.00000 |
| X9 = −0.87666 | Y9 = 0.26437 | Z9 = 13.00000 |
| X10 = −0.88469 | Y10 = 0.24061 | Z10 = 13.00000 |
| X11 = 0.65605 | Y11 = −0.68065 | Z11 = 13.00000 |
| X12 = 0.61180 | Y12 = −0.57486 | Z12 = 13.00000 |
| X13 = 0.56545 | Y13 = −0.46997 | Z13 = 13.00000 |
| X14 = 0.51805 | Y14 = −0.36554 | Z14 = 13.00000 |
| X15 = 0.46899 | Y15 = −0.26189 | Z15 = 13.00000 |
| X16 = 0.41729 | Y16 = −0.15954 | Z16 = 13.00000 |
| X17 = 0.36222 | Y17 = −0.05895 | Z17 = 13.00000 |
| X18 = 0.30263 | Y18 = 0.03901 | Z18 = 13.00000 |
| X19 = 0.23704 | Y19 = 0.13305 | Z19 = 13.00000 |
| X20 = 0.16434 | Y20 = 0.22170 | Z20 = 13.00000 |
| X21 = 0.08403 | Y21 = 0.30350 | Z21 = 13.00000 |
| X22 = −0.00428 | Y22 = 0.37657 | Z22 = 13.00000 |
| X23 = −0.10105 | Y23 = 0.43794 | Z23 = 13.00000 |
| X24 = −0.20577 | Y24 = 0.48438 | Z24 = 13.00000 |
| X25 = −0.31687 | Y25 = 0.51214 | Z25 = 13.00000 |
| X26 = −0.43198 | Y26 = 0.51872 | Z26 = 13.00000 |
| X27 = −0.54447 | Y27 = 0.50218 | Z27 = 13.00000 |
| X28 = −0.65224 | Y28 = 0.46360 | Z28 = 13.00000 |
| X29 = −0.75028 | Y29 = 0.40443 | Z29 = 13.00000 |
| X30 = −0.83409 | Y30 = 0.32650 | Z30 = 13.00000 |
| X31 = 0.65605 | Y31 = −0.68065 | Z31 = 13.00000 |
| X32 = 0.65619 | Y32 = −0.68887 | Z32 = 13.00000 |
| X33 = 0.65071 | Y33 = −0.69513 | Z33 = 13.00000 |
| X34 = 0.64255 | Y34 = −0.69625 | Z34 = 13.00000 |
| X35 = 0.63570 | Y35 = −0.69161 | Z35 = 13.00000 |
| X36 = 0.63570 | Y36 = −0.69161 | Z36 = 13.00000 |
| X37 = 0.58153 | Y37 = −0.61400 | Z37 = 13.00000 |
| X38 = 0.52743 | Y38 = −0.53634 | Z38 = 13.00000 |
| X39 = 0.47170 | Y39 = −0.45985 | Z39 = 13.00000 |
| X40 = 0.41354 | Y40 = −0.38519 | Z40 = 13.00000 |
| X41 = 0.35234 | Y41 = −0.31301 | Z41 = 13.00000 |
| X42 = 0.28765 | Y42 = −0.24394 | Z42 = 13.00000 |
| X43 = 0.21919 | Y43 = −0.17859 | Z43 = 13.00000 |
| X44 = 0.14706 | Y44 = −0.11734 | Z44 = 13.00000 |
| X45 = 0.07155 | Y45 = −0.06030 | Z45 = 13.00000 |
| X46 = −0.00721 | Y46 = −0.00783 | Z46 = 13.00000 |
| X47 = −0.08917 | Y47 = 0.03946 | Z47 = 13.00000 |
| X48 = −0.17442 | Y48 = 0.08051 | Z48 = 13.00000 |
| X49 = −0.26266 | Y49 = 0.11466 | Z49 = 13.00000 |
| X50 = −0.35332 | Y50 = 0.14176 | Z50 = 13.00000 |
| X51 = −0.44583 | Y51 = 0.16163 | Z51 = 13.00000 |
| X52 = −0.53949 | Y52 = 0.17515 | Z52 = 13.00000 |
| X53 = −0.63364 | Y53 = 0.18480 | Z53 = 13.00000 |
| X54 = −0.72795 | Y54 = 0.19281 | Z54 = 13.00000 |
| X55 = −0.82224 | Y55 = 0.20087 | Z55 = 13.00000 |
| X56 = −0.82224 | Y56 = 0.20087 | Z56 = 13.00000 |

TABLE 1-continued

Coordinates for airfoils on the second stage nozzle guide vane (in).

| | | |
|---|---|---|
| X57 = −0.83413 | Y57 = 0.20256 | Z57 = 13.00000 |
| X58 = −0.84592 | Y58 = 0.20487 | Z58 = 13.00000 |
| X59 = −0.85750 | Y59 = 0.20801 | Z59 = 13.00000 |
| X60 = −0.86876 | Y60 = 0.21218 | Z60 = 13.00000 |
| G. Section height 13.50 | | |
| X1 = −0.88613 | Y1 = 0.18801 | Z1 = 13.50000 |
| X2 = −0.89336 | Y2 = 0.19240 | Z2 = 13.50000 |
| X3 = −0.89880 | Y3 = 0.19889 | Z3 = 13.50000 |
| X4 = −0.90200 | Y4 = 0.20672 | Z4 = 13.50000 |
| X5 = −0.90256 | Y5 = 0.21517 | Z5 = 13.50000 |
| X6 = −0.90256 | Y6 = 0.21517 | Z6 = 13.50000 |
| X7 = −0.89341 | Y7 = 0.24449 | Z7 = 13.50000 |
| X8 = −0.87826 | Y8 = 0.27136 | Z8 = 13.50000 |
| X9 = −0.85987 | Y9 = 0.29615 | Z9 = 13.50000 |
| X10 = −0.83958 | Y10 = 0.31940 | Z10 = 13.50000 |
| X11 = −0.83958 | Y11 = 0.31940 | Z11 = 13.50000 |
| X12 = −0.75172 | Y12 = 0.39465 | Z12 = 13.50000 |
| X13 = −0.65043 | Y13 = 0.45070 | Z13 = 13.50000 |
| X14 = −0.54000 | Y14 = 0.48534 | Z14 = 13.50000 |
| X15 = −0.42493 | Y15 = 0.49781 | Z15 = 13.50000 |
| X16 = −0.30964 | Y16 = 0.48739 | Z16 = 13.50000 |
| X17 = −0.19805 | Y17 = 0.45648 | Z17 = 13.50000 |
| X18 = −0.09298 | Y18 = 0.40775 | Z18 = 13.50000 |
| X19 = 0.00430 | Y19 = 0.34485 | Z19 = 13.50000 |
| X20 = 0.09330 | Y20 = 0.27064 | Z20 = 13.50000 |
| X21 = 0.17430 | Y21 = 0.18775 | Z21 = 13.50000 |
| X22 = 0.24779 | Y22 = 0.09812 | Z22 = 13.50000 |
| X23 = 0.31439 | Y23 = 0.00326 | Z23 = 13.50000 |
| X24 = 0.37504 | Y24 = −0.09553 | Z24 = 13.50000 |
| X25 = 0.43104 | Y25 = −0.19704 | Z25 = 13.50000 |
| X26 = 0.48349 | Y26 = −0.30042 | Z26 = 13.50000 |
| X27 = 0.53314 | Y27 = −0.40518 | Z27 = 13.50000 |
| X28 = 0.58097 | Y28 = −0.51079 | Z28 = 13.50000 |
| X29 = 0.62770 | Y29 = −0.61689 | Z29 = 13.50000 |
| X30 = 0.67248 | Y30 = −0.72382 | Z30 = 13.50000 |
| X31 = 0.67248 | Y31 = −0.72382 | Z31 = 13.50000 |
| X32 = 0.67265 | Y32 = −0.73209 | Z32 = 13.50000 |
| X33 = 0.66715 | Y33 = −0.73839 | Z33 = 13.50000 |
| X34 = 0.65895 | Y34 = −0.73956 | Z34 = 13.50000 |
| X35 = 0.65204 | Y35 = −0.73494 | Z35 = 13.50000 |
| X36 = −0.83101 | Y36 = 0.17606 | Z36 = 13.50000 |
| X37 = −0.73459 | Y37 = 0.16766 | Z37 = 13.50000 |
| X38 = −0.63796 | Y38 = 0.16185 | Z38 = 13.50000 |
| X39 = −0.54141 | Y39 = 0.15500 | Z39 = 13.50000 |
| X40 = −0.44529 | Y40 = 0.14363 | Z40 = 13.50000 |
| X41 = −0.35029 | Y41 = 0.12521 | Z41 = 13.50000 |
| X42 = −0.25718 | Y42 = 0.09885 | Z42 = 13.50000 |
| X43 = −0.16665 | Y43 = 0.06467 | Z43 = 13.50000 |
| X44 = −0.07935 | Y44 = 0.02292 | Z44 = 13.50000 |
| X45 = 0.00433 | Y45 = −0.02571 | Z45 = 13.50000 |
| X46 = 0.08424 | Y46 = −0.08030 | Z46 = 13.50000 |
| X47 = 0.16033 | Y47 = −0.14012 | Z47 = 13.50000 |
| X48 = 0.23256 | Y48 = −0.20454 | Z48 = 13.50000 |
| X49 = 0.30091 | Y49 = −0.27306 | Z49 = 13.50000 |
| X50 = 0.36550 | Y50 = −0.34515 | Z50 = 13.50000 |
| X51 = 0.42672 | Y51 = −0.42012 | Z51 = 13.50000 |
| X52 = 0.48513 | Y52 = −0.49731 | Z52 = 13.50000 |
| X53 = 0.54143 | Y53 = −0.57604 | Z53 = 13.50000 |
| X54 = 0.59650 | Y54 = −0.65565 | Z54 = 13.50000 |
| X55 = 0.65204 | Y55 = −0.73494 | Z55 = 13.50000 |
| X56 = −0.88613 | Y56 = 0.18801 | Z56 = 13.50000 |
| X57 = −0.87275 | Y57 = 0.18346 | Z57 = 13.50000 |
| X58 = −0.85898 | Y58 = 0.18026 | Z58 = 13.50000 |
| X59 = −0.84503 | Y59 = 0.17793 | Z59 = 13.50000 |
| X60 = −0.83101 | Y60 = 0.17606 | Z60 = 13.50000 |
| H. Section height 14.00 | | |
| X1 = −0.92003 | Y1 = 0.20783 | Z1 = 14.00000 |
| X2 = −0.91902 | Y2 = 0.19943 | Z2 = 14.00000 |
| X3 = −0.91542 | Y3 = 0.19178 | Z3 = 14.00000 |
| X4 = −0.90966 | Y4 = 0.18557 | Z4 = 14.00000 |
| X5 = −0.90223 | Y5 = 0.18153 | Z5 = 14.00000 |
| X6 = −0.92003 | Y6 = 0.20783 | Z6 = 14.00000 |
| X7 = −0.91256 | Y7 = 0.23638 | Z7 = 14.00000 |
| X8 = −0.89856 | Y8 = 0.26251 | Z8 = 14.00000 |
| X9 = −0.88092 | Y9 = 0.28636 | Z9 = 14.00000 |
| X10 = −0.86114 | Y10 = 0.30847 | Z10 = 14.00000 |
| X11 = −0.86114 | Y11 = 0.30847 | Z11 = 14.00000 |
| X12 = −0.77006 | Y12 = 0.38328 | Z12 = 14.00000 |
| X13 = −0.66503 | Y13 = 0.43704 | Z13 = 14.00000 |
| X14 = −0.55140 | Y14 = 0.46873 | Z14 = 14.00000 |
| X15 = −0.43379 | Y15 = 0.47826 | Z15 = 14.00000 |
| X16 = −0.31647 | Y16 = 0.46553 | Z16 = 14.00000 |
| X17 = −0.20298 | Y17 = 0.43310 | Z17 = 14.00000 |
| X18 = −0.09583 | Y18 = 0.38349 | Z18 = 14.00000 |
| X19 = 0.00374 | Y19 = 0.32000 | Z19 = 14.00000 |
| X20 = 0.09499 | Y20 = 0.24500 | Z20 = 14.00000 |
| X21 = 0.17793 | Y21 = 0.16091 | Z21 = 14.00000 |
| X22 = 0.25326 | Y22 = 0.06990 | Z22 = 14.00000 |
| X23 = 0.32192 | Y23 = −0.02625 | Z23 = 14.00000 |
| X24 = 0.38472 | Y24 = −0.12633 | Z24 = 14.00000 |
| X25 = 0.44267 | Y25 = −0.22931 | Z25 = 14.00000 |
| X26 = 0.49673 | Y26 = −0.33438 | Z26 = 14.00000 |
| X27 = 0.54770 | Y27 = −0.44099 | Z27 = 14.00000 |
| X28 = 0.59649 | Y28 = −0.54862 | Z28 = 14.00000 |
| X29 = 0.64382 | Y29 = −0.65689 | Z29 = 14.00000 |
| X30 = 0.68896 | Y30 = −0.76609 | Z30 = 14.00000 |
| X31 = 0.68896 | Y31 = −0.76609 | Z31 = 14.00000 |
| X32 = 0.68913 | Y32 = −0.77432 | Z32 = 14.00000 |
| X33 = 0.68367 | Y33 = −0.78063 | Z33 = 14.00000 |
| X34 = 0.67551 | Y34 = −0.78183 | Z34 = 14.00000 |
| X35 = 0.66862 | Y35 = −0.77724 | Z35 = 14.00000 |
| X36 = −0.84796 | Y36 = 0.17093 | Z36 = 14.00000 |
| X37 = −0.74847 | Y37 = 0.16400 | Z37 = 14.00000 |
| X38 = −0.64874 | Y38 = 0.16121 | Z38 = 14.00000 |
| X39 = −0.54913 | Y39 = 0.15587 | Z39 = 14.00000 |
| X40 = −0.45008 | Y40 = 0.14404 | Z40 = 14.00000 |
| X41 = −0.35233 | Y41 = 0.12428 | Z41 = 14.00000 |
| X42 = −0.25667 | Y42 = 0.09602 | Z42 = 14.00000 |
| X43 = −0.16390 | Y43 = 0.05942 | Z43 = 14.00000 |
| X44 = −0.07458 | Y44 = 0.01504 | Z44 = 14.00000 |
| X45 = 0.01087 | Y45 = −0.03641 | Z45 = 14.00000 |
| X46 = 0.09214 | Y46 = −0.09425 | Z46 = 14.00000 |
| X47 = 0.16915 | Y47 = −0.15765 | Z47 = 14.00000 |
| X48 = 0.24204 | Y48 = −0.22575 | Z48 = 14.00000 |
| X49 = 0.31102 | Y49 = −0.29781 | Z49 = 14.00000 |
| X50 = 0.37637 | Y50 = −0.37318 | Z50 = 14.00000 |
| X51 = 0.43841 | Y51 = −0.45131 | Z51 = 14.00000 |
| X52 = 0.49775 | Y52 = −0.53151 | Z52 = 14.00000 |
| X53 = 0.55513 | Y53 = −0.61313 | Z53 = 14.00000 |
| X54 = 0.61147 | Y54 = −0.69547 | Z54 = 14.00000 |
| X55 = 0.66862 | Y55 = −0.77724 | Z55 = 14.00000 |
| X56 = −0.90223 | Y56 = 0.18153 | Z56 = 14.00000 |
| X57 = −0.88895 | Y57 = 0.17759 | Z57 = 14.00000 |
| X58 = −0.87539 | Y58 = 0.17482 | Z58 = 14.00000 |
| X59 = −0.86170 | Y59 = 0.17273 | Z59 = 14.00000 |
| X60 = −0.84796 | Y60 = 0.17093 | Z60 = 14.00000 |
| I. Section height 14.50 | | |
| X1 = −0.91908 | Y1 = 0.17695 | Z1 = 14.50000 |
| X2 = −0.92675 | Y2 = 0.18108 | Z2 = 14.50000 |
| X3 = −0.93264 | Y3 = 0.18751 | Z3 = 14.50000 |
| X4 = −0.93623 | Y4 = 0.19544 | Z4 = 14.50000 |
| X5 = −0.93705 | Y5 = 0.20412 | Z5 = 14.50000 |
| X6 = −0.93705 | Y6 = 0.20412 | Z6 = 14.50000 |
| X7 = −0.92901 | Y7 = 0.23156 | Z7 = 14.50000 |
| X8 = −0.91468 | Y8 = 0.25646 | Z8 = 14.50000 |
| X9 = −0.89703 | Y9 = 0.27915 | Z9 = 14.50000 |
| X10 = −0.87735 | Y10 = 0.30011 | Z10 = 14.50000 |
| X11 = −0.87735 | Y11 = 0.30011 | Z11 = 14.50000 |
| X12 = −0.78244 | Y12 = 0.37382 | Z12 = 14.50000 |
| X13 = −0.67370 | Y13 = 0.42531 | Z13 = 14.50000 |
| X14 = −0.55701 | Y14 = 0.45448 | Z14 = 14.50000 |
| X15 = −0.43689 | Y15 = 0.46136 | Z15 = 14.50000 |
| X16 = −0.31753 | Y16 = 0.44607 | Z16 = 14.50000 |
| X17 = −0.20232 | Y17 = 0.41124 | Z17 = 14.50000 |
| X18 = −0.09366 | Y18 = 0.35942 | Z18 = 14.50000 |
| X19 = 0.00735 | Y19 = 0.29388 | Z19 = 14.50000 |
| X20 = 0.09997 | Y20 = 0.21691 | Z20 = 14.50000 |
| X21 = 0.18413 | Y21 = 0.13075 | Z21 = 14.50000 |
| X22 = 0.26045 | Y22 = 0.03756 | Z22 = 14.50000 |
| X23 = 0.33007 | Y23 = −0.06076 | Z23 = 14.50000 |
| X24 = 0.39411 | Y24 = −0.16280 | Z24 = 14.50000 |

TABLE 1-continued

Coordinates for airfoils on the second stage nozzle guide vane (in).

| | | |
|---|---|---|
| X25 = 0.45344 | Y25 = −0.26766 | Z25 = 14.50000 |
| X26 = 0.50884 | Y26 = −0.37465 | Z26 = 14.50000 |
| X27 = 0.56115 | Y27 = −0.48319 | Z27 = 14.50000 |
| X28 = 0.61118 | Y28 = −0.59279 | Z28 = 14.50000 |
| X29 = 0.65948 | Y29 = −0.70318 | Z29 = 14.50000 |
| X30 = 0.70528 | Y30 = −0.81461 | Z30 = 14.50000 |
| X31 = 0.70528 | Y31 = −0.81461 | Z31 = 14.50000 |
| X32 = 0.70544 | Y32 = −0.82280 | Z32 = 14.50000 |
| X33 = 0.70006 | Y33 = −0.82911 | Z33 = 14.50000 |
| X34 = 0.69197 | Y34 = −0.83038 | Z34 = 14.50000 |
| X35 = 0.68511 | Y35 = −0.82583 | Z35 = 14.50000 |
| X36 = −0.86647 | Y36 = 0.16770 | Z36 = 14.50000 |
| X37 = −0.76386 | Y37 = 0.16434 | Z37 = 14.50000 |
| X38 = −0.66121 | Y38 = 0.16202 | Z38 = 14.50000 |
| X39 = −0.55884 | Y39 = 0.15422 | Z39 = 14.50000 |
| X40 = −0.45737 | Y40 = 0.13856 | Z40 = 14.50000 |
| X41 = −0.35748 | Y41 = 0.11490 | Z41 = 14.50000 |
| X42 = −0.25986 | Y42 = 0.08312 | Z42 = 14.50000 |
| X43 = −0.16532 | Y43 = 0.04312 | Z43 = 14.50000 |
| X44 = −0.07434 | Y44 = −0.00445 | Z44 = 14.50000 |
| X45 = 0.01274 | Y45 = −0.05883 | Z45 = 14.50000 |
| X46 = 0.09561 | Y46 = −0.11943 | Z46 = 14.50000 |
| X47 = 0.17424 | Y47 = −0.18546 | Z47 = 14.50000 |
| X48 = 0.24878 | Y48 = −0.25607 | Z48 = 14.50000 |
| X49 = 0.31939 | Y49 = −0.33061 | Z49 = 14.50000 |
| X50 = 0.38625 | Y50 = −0.40854 | Z50 = 14.50000 |
| X51 = 0.44966 | Y51 = −0.48931 | Z51 = 14.50000 |
| X52 = 0.51024 | Y52 = −0.57221 | Z52 = 14.50000 |
| X53 = 0.56884 | Y53 = −0.65654 | Z53 = 14.50000 |
| X54 = 0.62645 | Y54 = −0.74155 | Z54 = 14.50000 |
| X55 = 0.68511 | Y55 = −0.82583 | Z55 = 14.50000 |
| X56 = −0.91908 | Y56 = 0.17695 | Z56 = 14.50000 |
| X57 = −0.90622 | Y57 = 0.17324 | Z57 = 14.50000 |
| X58 = −0.89308 | Y58 = 0.17072 | Z58 = 14.50000 |
| X59 = −0.87980 | Y59 = 0.16898 | Z59 = 14.50000 |
| X60 = −0.86647 | Y60 = 0.16770 | Z60 = 14.50000 |
| J. Section height 15.00 | | |
| X1 = −0.95367 | Y1 = 0.19718 | Z1 = 15.00000 |
| X2 = −0.95395 | Y2 = 0.18793 | Z2 = 15.00000 |
| X3 = −0.95106 | Y3 = 0.17915 | Z3 = 15.00000 |
| X4 = −0.94542 | Y4 = 0.17181 | Z4 = 15.00000 |
| X5 = −0.93760 | Y5 = 0.16688 | Z5 = 15.00000 |
| X6 = −0.95367 | Y6 = 0.19718 | Z6 = 15.00000 |
| X7 = −0.94297 | Y7 = 0.22202 | Z7 = 15.00000 |
| X8 = −0.92739 | Y8 = 0.24429 | Z8 = 15.00000 |
| X9 = −0.90968 | Y9 = 0.26491 | Z9 = 15.00000 |
| X10 = −0.89055 | Y10 = 0.28422 | Z10 = 15.00000 |
| X11 = −0.89055 | Y11 = 0.28422 | Z11 = 15.00000 |
| X12 = −0.79221 | Y12 = 0.35825 | Z12 = 15.00000 |
| X13 = −0.68040 | Y13 = 0.41011 | Z13 = 15.00000 |
| X14 = −0.56091 | Y14 = 0.44005 | Z14 = 15.00000 |
| X15 = −0.43788 | Y15 = 0.44711 | Z15 = 15.00000 |
| X16 = −0.31576 | Y16 = 0.43072 | Z16 = 15.00000 |
| X17 = −0.19828 | Y17 = 0.39342 | Z17 = 15.00000 |
| X18 = −0.08811 | Y18 = 0.33810 | Z18 = 15.00000 |
| X19 = 0.01377 | Y19 = 0.26861 | Z19 = 15.00000 |
| X20 = 0.10698 | Y20 = 0.18784 | Z20 = 15.00000 |
| X21 = 0.19187 | Y21 = 0.09834 | Z21 = 15.00000 |
| X22 = 0.26852 | Y22 = 0.00169 | Z22 = 15.00000 |
| X23 = 0.33787 | Y23 = −0.10036 | Z23 = 15.00000 |
| X24 = 0.40193 | Y24 = −0.20582 | Z24 = 15.00000 |
| X25 = 0.46178 | Y25 = −0.31372 | Z25 = 15.00000 |
| X26 = 0.51818 | Y26 = −0.42347 | Z26 = 15.00000 |
| X27 = 0.57195 | Y27 = −0.53453 | Z27 = 15.00000 |
| X28 = 0.62379 | Y28 = −0.64652 | Z28 = 15.00000 |
| X29 = 0.67391 | Y29 = −0.75927 | Z29 = 15.00000 |
| X30 = 0.72129 | Y30 = −0.87320 | Z30 = 15.00000 |
| X31 = 0.72129 | Y31 = −0.87320 | Z31 = 15.00000 |
| X32 = 0.72148 | Y32 = −0.88137 | Z32 = 15.00000 |
| X33 = 0.71620 | Y33 = −0.88773 | Z33 = 15.00000 |
| X34 = 0.70815 | Y34 = −0.88910 | Z34 = 15.00000 |
| X35 = 0.70130 | Y35 = −0.88459 | Z35 = 15.00000 |
| X36 = −0.85707 | Y36 = 0.15878 | Z36 = 15.00000 |
| X37 = −0.75325 | Y37 = 0.16050 | Z37 = 15.00000 |
| X38 = −0.64977 | Y38 = 0.15235 | Z38 = 15.00000 |
| X39 = −0.54738 | Y39 = 0.13519 | Z39 = 15.00000 |
| X40 = −0.44648 | Y40 = 0.11070 | Z40 = 15.00000 |
| X41 = −0.34732 | Y41 = 0.07992 | Z41 = 15.00000 |
| X42 = −0.25040 | Y42 = 0.04269 | Z42 = 15.00000 |
| X43 = −0.15654 | Y43 = −0.00168 | Z43 = 15.00000 |
| X44 = −0.06611 | Y44 = −0.05271 | Z44 = 15.00000 |
| X45 = 0.02075 | Y45 = −0.10960 | Z45 = 15.00000 |
| X46 = 0.10400 | Y46 = −0.17163 | Z46 = 15.00000 |
| X47 = 0.18369 | Y47 = −0.23820 | Z47 = 15.00000 |
| X48 = 0.25983 | Y48 = −0.30881 | Z48 = 15.00000 |
| X49 = 0.33191 | Y49 = −0.38354 | Z49 = 15.00000 |
| X50 = 0.39986 | Y50 = −0.46207 | Z50 = 15.00000 |
| X51 = 0.46410 | Y51 = −0.54364 | Z51 = 15.00000 |
| X52 = 0.52517 | Y52 = −0.62763 | Z52 = 15.00000 |
| X53 = 0.58406 | Y53 = −0.71316 | Z53 = 15.00000 |
| X54 = 0.64229 | Y54 = −0.79914 | Z54 = 15.00000 |
| X55 = 0.70130 | Y55 = −0.88459 | Z55 = 15.00000 |
| X56 = −0.93760 | Y56 = 0.16688 | Z56 = 15.00000 |
| X57 = −0.91809 | Y57 = 0.16101 | Z57 = 15.00000 |
| X58 = −0.89786 | Y58 = 0.15845 | Z58 = 15.00000 |
| X59 = −0.87745 | Y59 = 0.15809 | Z59 = 15.00000 |
| X60 = −0.85707 | Y60 = 0.15878 | Z60 = 15.00000 |
| K. Section height 15.50 | | |
| X1 = −0.97023 | Y1 = 0.18935 | Z1 = 15.50000 |
| X2 = −0.97184 | Y2 = 0.17951 | Z2 = 15.50000 |
| X3 = −0.96983 | Y3 = 0.16976 | Z3 = 15.50000 |
| X4 = −0.96454 | Y4 = 0.16130 | Z4 = 15.50000 |
| X5 = −0.95657 | Y5 = 0.15534 | Z5 = 15.50000 |
| X6 = −0.97023 | Y6 = 0.18935 | Z6 = 15.50000 |
| X7 = −0.95460 | Y7 = 0.21623 | Z7 = 15.50000 |
| X8 = −0.93196 | Y8 = 0.23780 | Z8 = 15.50000 |
| X9 = −0.91007 | Y9 = 0.26015 | Z9 = 15.50000 |
| X10 = −0.88801 | Y10 = 0.28233 | Z10 = 15.50000 |
| X11 = −0.88801 | Y11 = 0.28233 | Z11 = 15.50000 |
| X12 = −0.78339 | Y12 = 0.35142 | Z12 = 15.50000 |
| X13 = −0.66788 | Y13 = 0.39999 | Z13 = 15.50000 |
| X14 = −0.54579 | Y14 = 0.42824 | Z14 = 15.50000 |
| X15 = −0.42055 | Y15 = 0.43278 | Z15 = 15.50000 |
| X16 = −0.29682 | Y16 = 0.41297 | Z16 = 15.50000 |
| X17 = −0.17869 | Y17 = 0.37106 | Z17 = 15.50000 |
| X18 = 0.06895 | Y18 = 0.31042 | Z18 = 15.50000 |
| X19 = 0.03165 | Y19 = 0.23550 | Z19 = 15.50000 |
| X20 = 0.12345 | Y20 = 0.15000 | Z20 = 15.50000 |
| X21 = 0.20732 | Y21 = 0.05668 | Z21 = 15.50000 |
| X22 = 0.28259 | Y22 = −0.04369 | Z22 = 15.50000 |
| X23 = 0.34994 | Y23 = −0.14958 | Z23 = 15.50000 |
| X24 = 0.41246 | Y24 = −0.25838 | Z24 = 15.50000 |
| X25 = 0.47161 | Y25 = −0.36907 | Z25 = 15.50000 |
| X26 = 0.52812 | Y26 = −0.48113 | Z26 = 15.50000 |
| X27 = 0.58283 | Y27 = −0.59408 | Z27 = 15.50000 |
| X28 = 0.63616 | Y28 = −0.70769 | Z28 = 15.50000 |
| X29 = 0.68814 | Y29 = −0.82192 | Z29 = 15.50000 |
| X30 = 0.73712 | Y30 = −0.93746 | Z30 = 15.50000 |
| X31 = 0.73712 | Y31 = −0.93746 | Z31 = 15.50000 |
| X32 = 0.73738 | Y32 = −0.94561 | Z32 = 15.50000 |
| X33 = 0.73218 | Y33 = −0.95203 | Z33 = 15.50000 |
| X34 = 0.72416 | Y34 = −0.95347 | Z34 = 15.50000 |
| X35 = 0.71730 | Y35 = −0.94901 | Z35 = 15.50000 |
| X36 = 0.71730 | Y36 = −0.94901 | Z36 = 15.50000 |
| X37 = 0.65600 | Y37 = −0.86024 | Z37 = 15.50000 |
| X38 = 0.59613 | Y38 = −0.77048 | Z38 = 15.50000 |
| X39 = 0.53486 | Y39 = −0.68168 | Z39 = 15.50000 |
| X40 = 0.47108 | Y40 = −0.59466 | Z40 = 15.50000 |
| X41 = 0.40363 | Y41 = −0.51047 | Z41 = 15.50000 |
| X42 = 0.33158 | Y42 = −0.43019 | Z42 = 15.50000 |
| X43 = 0.25461 | Y43 = −0.35461 | Z43 = 15.50000 |
| X44 = 0.17344 | Y44 = −0.28355 | Z44 = 15.50000 |
| X45 = 0.07826 | Y45 = −0.21608 | Z45 = 15.50000 |
| X46 = 0.00226 | Y46 = −0.15230 | Z46 = 15.50000 |
| X47 = −0.08769 | Y47 = −0.09274 | Z47 = 15.50000 |
| X48 = −0.18092 | Y48 = −0.03848 | Z48 = 15.50000 |
| X49 = −0.27753 | Y49 = −0.00950 | Z49 = 15.50000 |
| X50 = −0.37694 | Y50 = 0.05139 | Z50 = 15.50000 |
| X51 = −0.47812 | Y51 = 0.08884 | Z51 = 15.50000 |
| X52 = −0.58096 | Y52 = 0.12142 | Z52 = 15.50000 |
| X53 = −0.68594 | Y53 = 0.14610 | Z53 = 15.50000 |
| X54 = −0.79320 | Y54 = 0.15640 | Z54 = 15.50000 |

TABLE 1-continued

| Coordinates for airfoils on the second stage nozzle guide vane (in). | | |
| --- | --- | --- |
| X55 = −0.90047 | Y55 = 0.14618 | Z55 = 15.50000 |
| X56 = −0.90047 | Y56 = 0.14618 | Z56 = 15.50000 |
| X57 = −0.91482 | Y57 = 0.14545 | Z57 = 15.50000 |
| X58 = −0.92920 | Y58 = 0.14665 | Z58 = 15.50000 |
| X59 = −0.94322 | Y59 = 0.14997 | Z59 = 15.50000 |
| X60 = −0.95657 | Y60 = 0.15534 | Z60 = 15.50000 |

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. An airfoil comprising:
    an external surface having first and second sides, the external surface extending spanwise between a hub and a tip and streamwise between a leading edge and a trailing edge; and
    the external surface having a contour substantially defined by Table 1 as listed in the specification.

2. The airfoil of claim 1, further comprising:
    at least one coating formed on the external surface thereof.

3. The airfoil of claim 2, wherein the external surface including the at least one coating substantially meets the contour dimensions defined by Table 1.

4. The airfoil of claim 2, wherein an outer surface of the at least one coating extends outside of the contour dimensions as substantially defined by Table 1.

5. The airfoil of claim 2, wherein the coating includes at least one of a thermal barrier coating and a radiation barrier coating.

6. The airfoil of claim 1, wherein a portion of the external surface includes at least one discontinuity.

7. The airfoil of claim 6, wherein the at least one discontinuity includes a through aperture formed in at least one of the sides of the airfoil to provide an outlet path for cooling fluid to flow therethrough.

8. The airfoil of claim 1, wherein the airfoil is connected to a second stage turbine nozzle guide vane assembly.

9. The airfoil of claim 1, wherein the positional tolerance of the external surface is held to range of about +/−.025 inches for each dimension listed in Table 1.

10. A turbine nozzle guide vane assembly for a gas turbine engine comprising:
    an inner shroud having an upper surface and a lower surface, the upper surface of the inner shroud partially defining an inner flow path wall;
    an airfoil extending radially outward from the upper surface of the inner shroud relative to an axis of rotation of the gas turbine engine, the airfoil having first and second three-dimensional external surfaces extending between a hub and a tip in a spanwise direction and between a leading edge and a trailing edge in a streamwise direction; and
    a Cartesian coordinate array having X,Y and Z axis coordinates listed in Table 1 of the specification defining the first and second external surfaces of the airfoil, wherein the Z axis generally extends radially outward from at least one of the upper surface of the inner shroud or a longitudinal axis of the engine, the X axis generally extends normal to the Z axis in the streamwise direction, and the Y axis generally extends normal to both the X axis and the Z axis in a lateral direction.

11. The turbine nozzle guide vane assembly of claim 10, wherein the external surface of the airfoil is formed within a manufacturing tolerance of about +/−0.025 inches of each dimension listed in Table 1.

12. The turbine nozzle guide vane assembly of claim 10, wherein the Z axis further defines a stacking axis extending at a predefined angle from the inner shroud.

13. The turbine nozzle guide vane assembly of claim 12, wherein the angle of the stacking axis is located between a normal position and 25° from the normal position in any direction.

14. The turbine nozzle guide vane assembly of claim 10, further comprising:
    at least one coating formed on the external surface of the airfoil.

15. The turbine nozzle guide vane assembly of claim 14, wherein the at least one coating is applied to the airfoil such that an outer surface of the coating is located within a tolerance of +/−0.050 inches of the coordinate dimensions defined in Table 1.

16. The turbine nozzle guide vane assembly of claim 14, wherein the coating is at least one of a thermal barrier coating and a radiation barrier coating.

17. The turbine nozzle guide vane assembly of claim 10, wherein a portion of the external surface of the airfoil includes at least one discontinuity.

18. The turbine nozzle guide vane assembly of claim 17, wherein the at least one discontinuity includes a through aperture formed in at least one of the sides of the airfoil to provide an outlet path for cooling fluid to flow therethrough.

19. The turbine nozzle guide vane assembly of claim 10, wherein the airfoil includes an outer shroud formed adjacent the tip.

20. A method of forming an airfoil for a turbine nozzle guide vane comprising:
    forming a contoured three-dimensional external surface of an airfoil defined by Cartesian (X, Y and Z) coordinates listed in the specification as Table 1, wherein the Z axis coordinates are generally measured from an inner shroud or an engine centerline axis, the X axis coordinates are generally measured normal to the Z axis in a streamwise direction, and the Y axis coordinates are generally measured normal to the Z axis and normal to the X axis.

21. The method of claim 20, further comprising:
forming the airfoil from a casting process, wherein the casting process includes one of integrally casting the turbine nozzle guide vane in one piece and casting multiple pieces and subsequently bonding the cast pieces together.

22. The method of claim 20, further comprising:
forming the airfoil from a wrought material; and
machine processing a portion of the airfoil to meet a design specification.

* * * * *